(12) United States Patent
Chen et al.

(10) Patent No.: US 10,962,749 B2
(45) Date of Patent: Mar. 30, 2021

(54) OPTICAL LENS

(71) Applicant: Young Optics Inc., Hsinchu Science Park (TW)

(72) Inventors: Kai-Yun Chen, Hsinchu Science Park (TW); Pei-Ching Liu, Hsinchu Science Park (TW); Kuo-Chuan Wang, Hsinchu Science Park (TW)

(73) Assignee: Young Optics Inc., Hsinchu Science Park (TW)

( * ) Notice: Subject to any disclaimer, the term of this patent is extended or adjusted under 35 U.S.C. 154(b) by 243 days.

(21) Appl. No.: 16/038,645

(22) Filed: Jul. 18, 2018

(65) Prior Publication Data

US 2019/0025558 A1  Jan. 24, 2019

(30) Foreign Application Priority Data

Jul. 19, 2017  (TW) ................................ 106124205

(51) Int. Cl.
| | | |
|---|---|---|
| *G02B 15/173* | (2006.01) | |
| *G02B 13/22* | (2006.01) | |
| *G02B 13/18* | (2006.01) | |
| *G02B 13/00* | (2006.01) | |
| *G02B 5/04* | (2006.01) | |

(52) U.S. Cl.
CPC ......... *G02B 15/173* (2013.01); *G02B 13/002* (2013.01); *G02B 13/18* (2013.01); *G02B 13/22* (2013.01); *G02B 5/04* (2013.01)

(58) Field of Classification Search
CPC ...... G02B 15/173; G02B 15/14; G02B 15/20; G02B 27/646; G02B 13/009; G02B 15/16; G02B 15/163; G02B 27/0025; G02B 13/18; G02B 15/167; G02B 15/17; G02B 15/177; G02B 9/60; G02B 13/0045; G02B 15/142; G02B 5/005; G02B 13/006; G02B 9/00; G02B 9/62; G02B 13/0065; H04N 5/23296; H04N 5/2254; H04N 5/225; H04N 5/2253; H04N 5/23238; H04N 5/2628; H04N 5/369; H04N 5/2257; H04N 5/23212; H04N 5/262; H04N 5/372; H04N 7/18
See application file for complete search history.

(56) References Cited

U.S. PATENT DOCUMENTS

| | | | |
|---|---|---|---|
| 8,351,129 B2 | 1/2013 | Kon | |
| 2004/0240080 A1* | 12/2004 | Matsui | G02B 13/004 359/754 |
| 2005/0105194 A1* | 5/2005 | Matsui | G02B 9/34 359/772 |
| 2009/0257133 A1* | 10/2009 | Sano | G02B 13/004 359/715 |
| 2012/0075715 A1* | 3/2012 | Kon | G02B 15/173 359/683 |
| 2013/0141801 A1* | 6/2013 | Yun | G02B 13/16 359/716 |
| 2017/0068078 A1* | 3/2017 | Takakubo | G02B 13/009 |

* cited by examiner

*Primary Examiner* — William R Alexander
*Assistant Examiner* — Sharrief I Broome
(74) *Attorney, Agent, or Firm* — Muncy, Geissler, Olds & Lowe, P.C.

(57) ABSTRACT

An optical lens includes, in order along a direction, an aperture stop and a lens group with a positive refractive power. The aperture stop is disposed at an outermost side of all lenses of the optical lens, and the lens group has at least four lenses. At least one of the four lenses is an aspheric lens, and each of the four lenses has a clear aperture of smaller than 14 mm.

20 Claims, 26 Drawing Sheets

OPTICAL LENS

BACKGROUND OF THE INVENTION a. Field of the Invention

The invention relates generally to an optical system, and more particularly to an optical lens.

b. Description of the Related Art

Nowadays, as the optoelectronic technology advances, imaging devices, such as a projector, a digital video recorder, a digital camera, a head-mounted display, etcetera, are widely used for daily life. A core component of an imaging device is an optical lens whose performance is closely relative to the image quality of an imaging device. Hence, in order to enhance market competitiveness, an optical lens is continually improved by manufactures to increase its optical performance and reduce its weight, occupied space and fabrication costs. Therefore, it is desirable to provide a miniaturized, less expansive and high-performance optical lens having low aberration, large aperture and high resolution.

BRIEF SUMMARY OF THE INVENTION

According to one aspect of the present disclosure, an optical lens includes, in order along a direction, an aperture stop and a lens group with a positive refractive power. The aperture stop is disposed at an outermost side of all lenses of the optical lens, and the lens group has at least four lenses. At least one of the four lenses is an aspheric lens, and each of the four lenses has a clear aperture of smaller than 14 mm.

According to another aspect of the present disclosure, an optical lens includes an aperture stop and a lens group. The lens group includes at least four lenses, at least one of the four lenses is an aspheric lens, and each of the four lenses has a circular light-transmitting area with a diameter of smaller than 14 mm. The optical lens has a positive refractive power.

In the above aspects, each of the lenses in the lens group preferably has a clear aperture of smaller than 13.5 mm, and more preferably smaller than 13 mm.

According to another aspect of the present disclosure, an optical lens includes, in order along a direction, an aperture stop, an aspheric lens, a first prism and a lens group having at least four spherical lenses.

Accordingly, the above embodiments provide an optical lens that is favorable for miniaturization and has improved abbreviation correction in a limited space and good image quality.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etcetera, is used with reference to the orientation of the Figure(s) being described. The components of the invention can be positioned in a number of different orientations. As such, the directional terminology is used for purposes of illustration and is in no way limiting.

Further, "First," "Second," etcetera, as used herein, are used as labels for nouns that they precede, and do not imply any type of ordering (e.g., spatial, temporal, logical, etcetera).

The term "optical element" refers to an element formed of at least in part a material that may refract, reflect, diffract, diffuse or filter at least a portion of the light passing through it. The material may include plastic or glass, and the optical element may be, for example, a lens, a prism or an aperture stop.

In an embodiment of the optical projection system, a magnified side refers to one side of an optical path of an optical lens comparatively near a projected image (such as near a user's eyes), and a minified side refers to other side of the optical path comparatively near a light valve. In an image-pickup system, a magnified side refers to one side of an optical path of an optical lens comparatively near a subject to be picked-up, and a minified side refers to other side of the optical path comparatively near an image sensor.

In an embodiment, the magnified side of the optical lens possesses the afocal characteristic, which means no net convergence or divergence of the beam passing through the magnified side of the optical lens is substantially produced.

In an embodiment, the minified side of the optical lens possesses the telecentric characteristic, which means the chief rays passing the second side of the optical lens are substantially parallel to the optical axis of the optical lens.

Figure 1A:
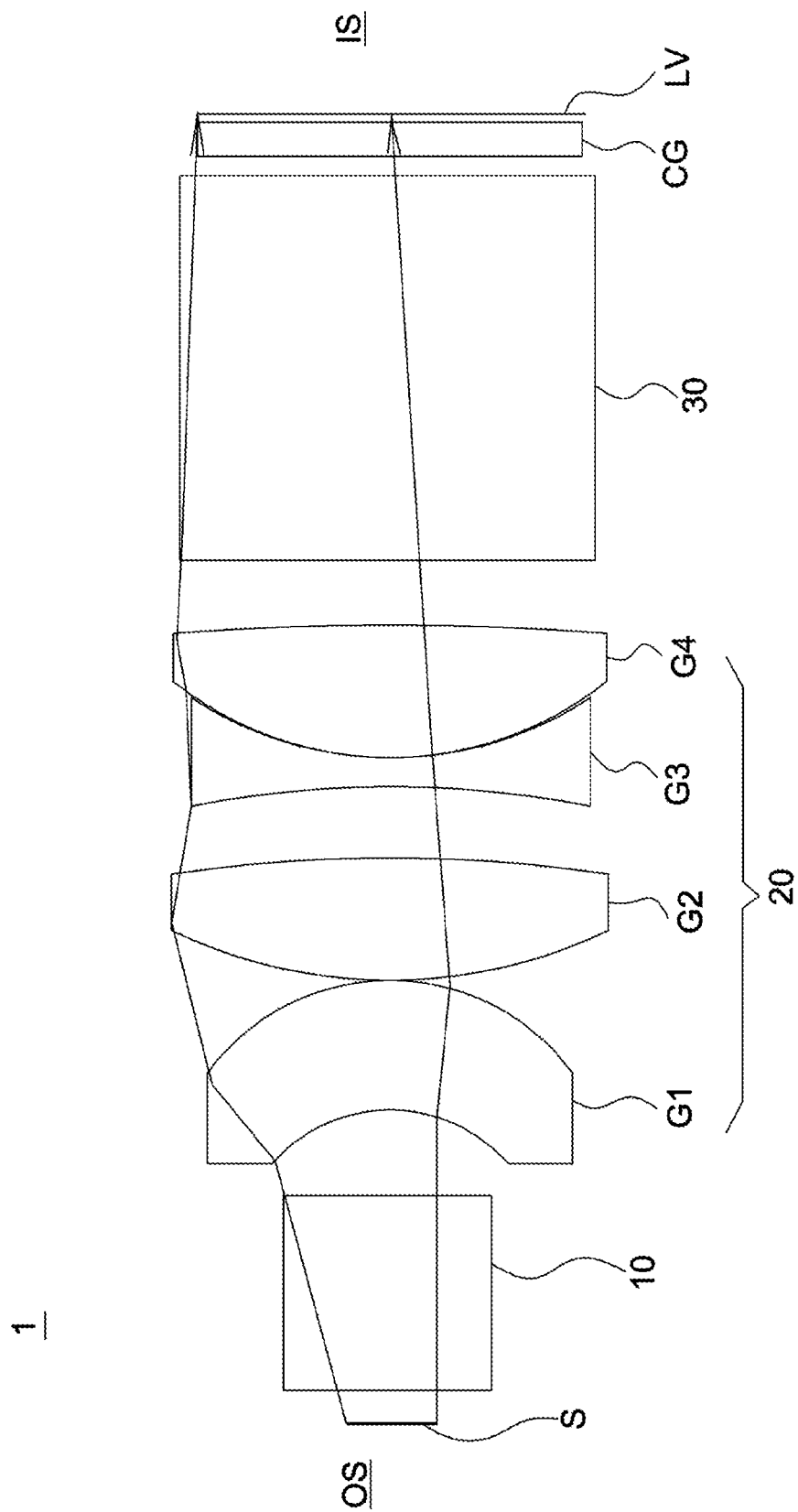
FIGS. 1A and 1B show schematic diagrams illustrating the layout and performance of an optical lens according to a first embodiment of the invention.
Figure 1B:
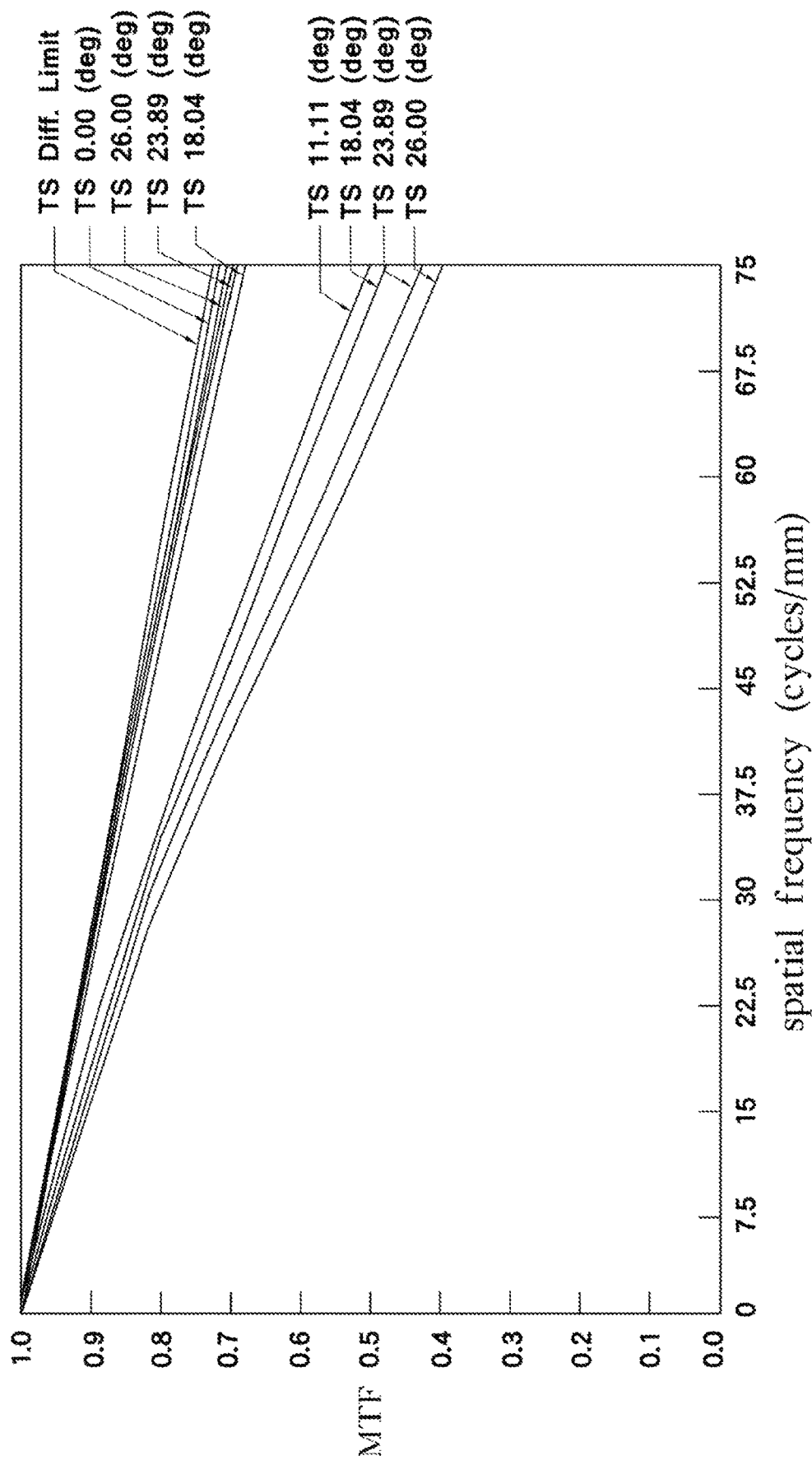
Figure 2A:
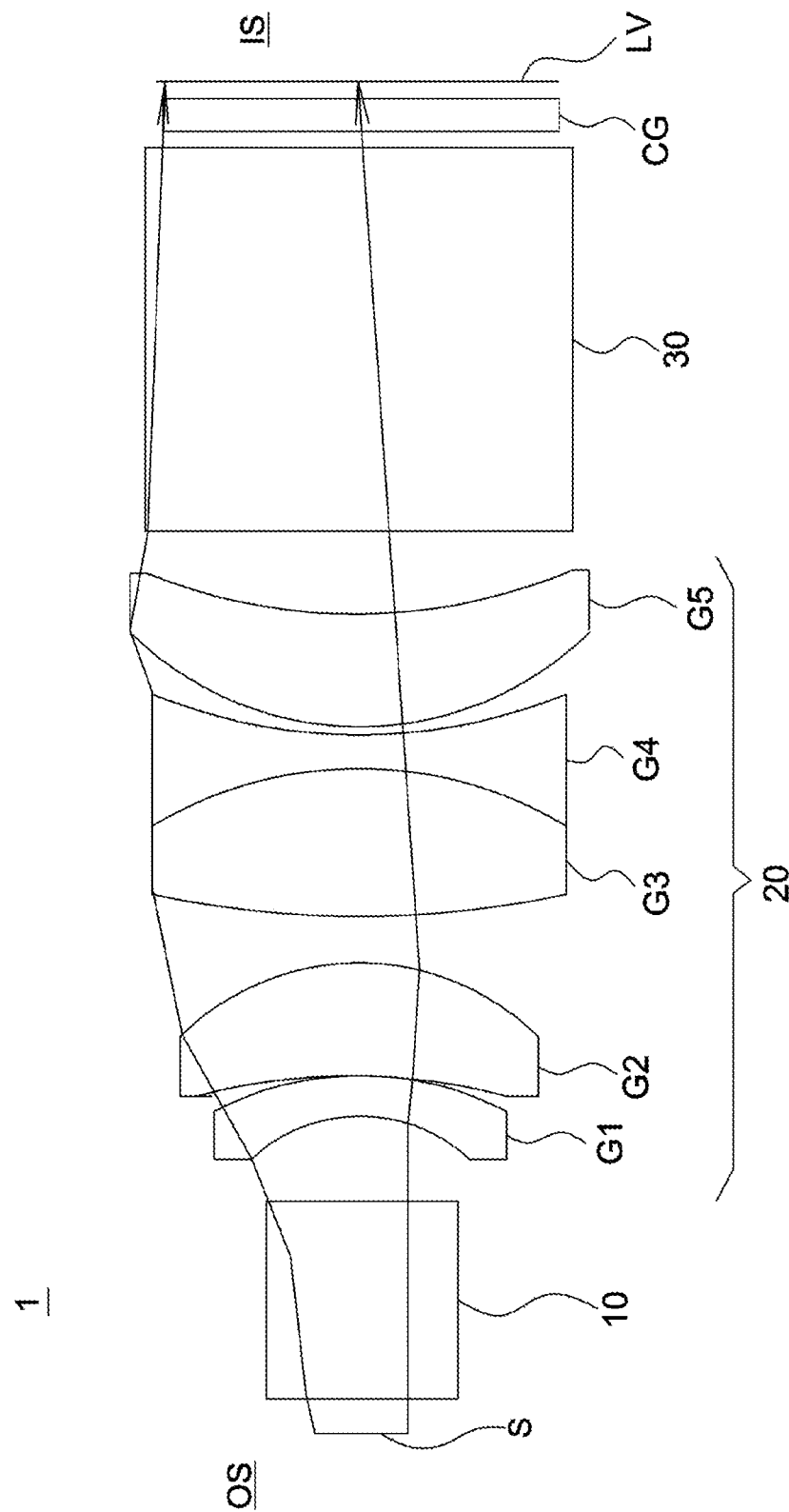
FIGS. 2A and 2B show schematic diagrams illustrating the layout and performance of an optical lens according to a second embodiment of the invention.
Figure 2B:
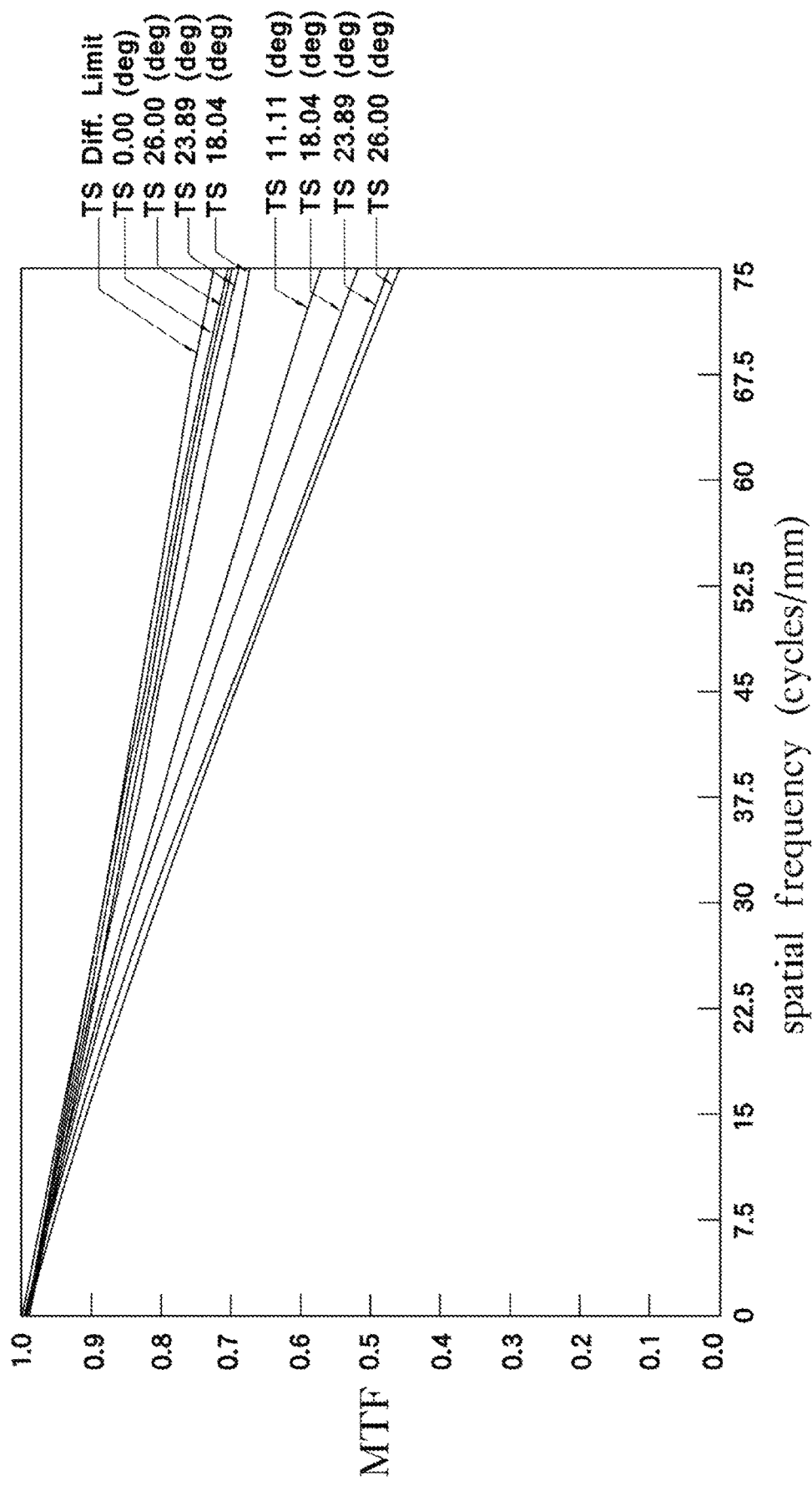
Figure 3A:
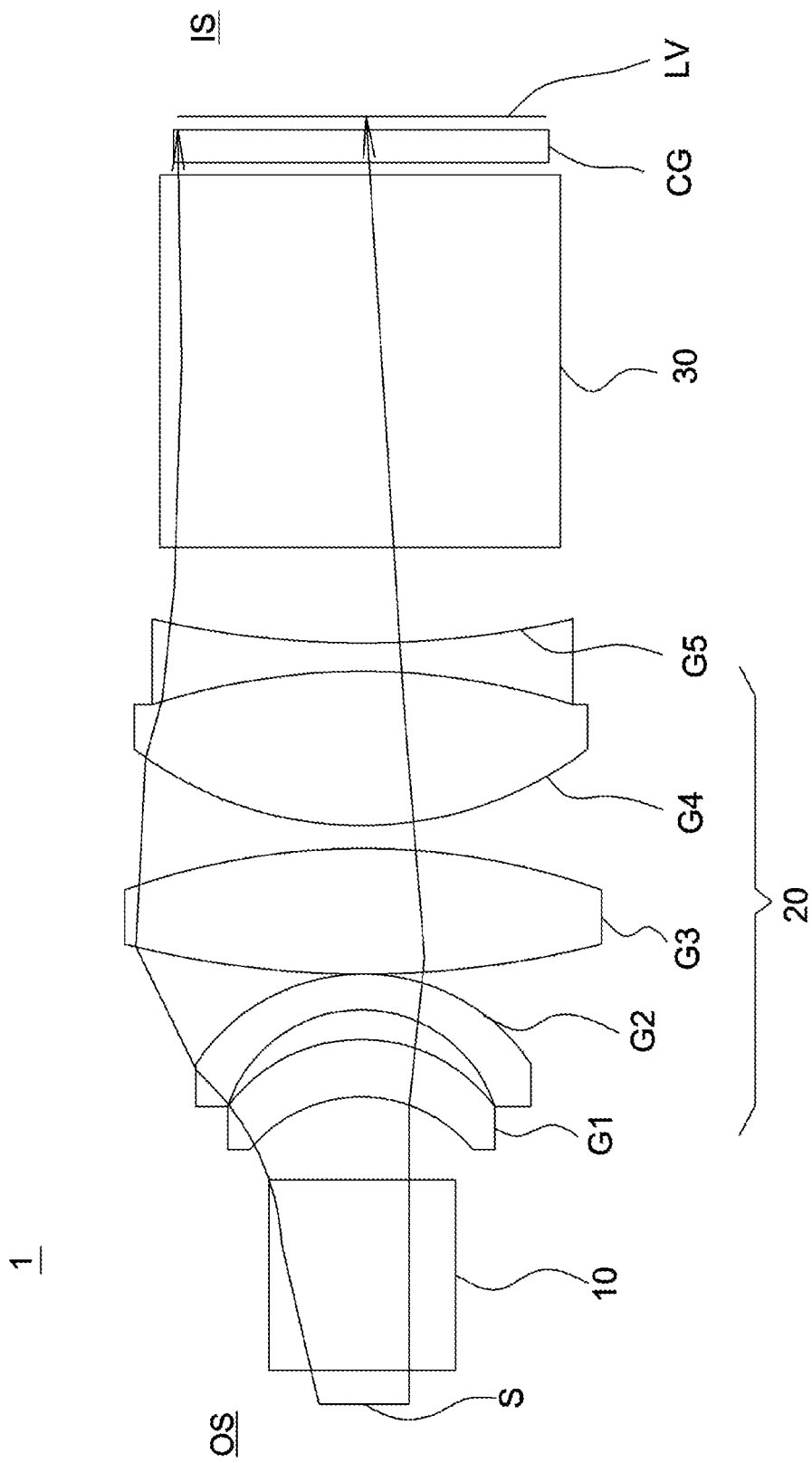
FIGS. 3A and 3B show schematic diagrams illustrating the layout and performance of an optical lens according to a third embodiment of the invention.
Figure 3B:
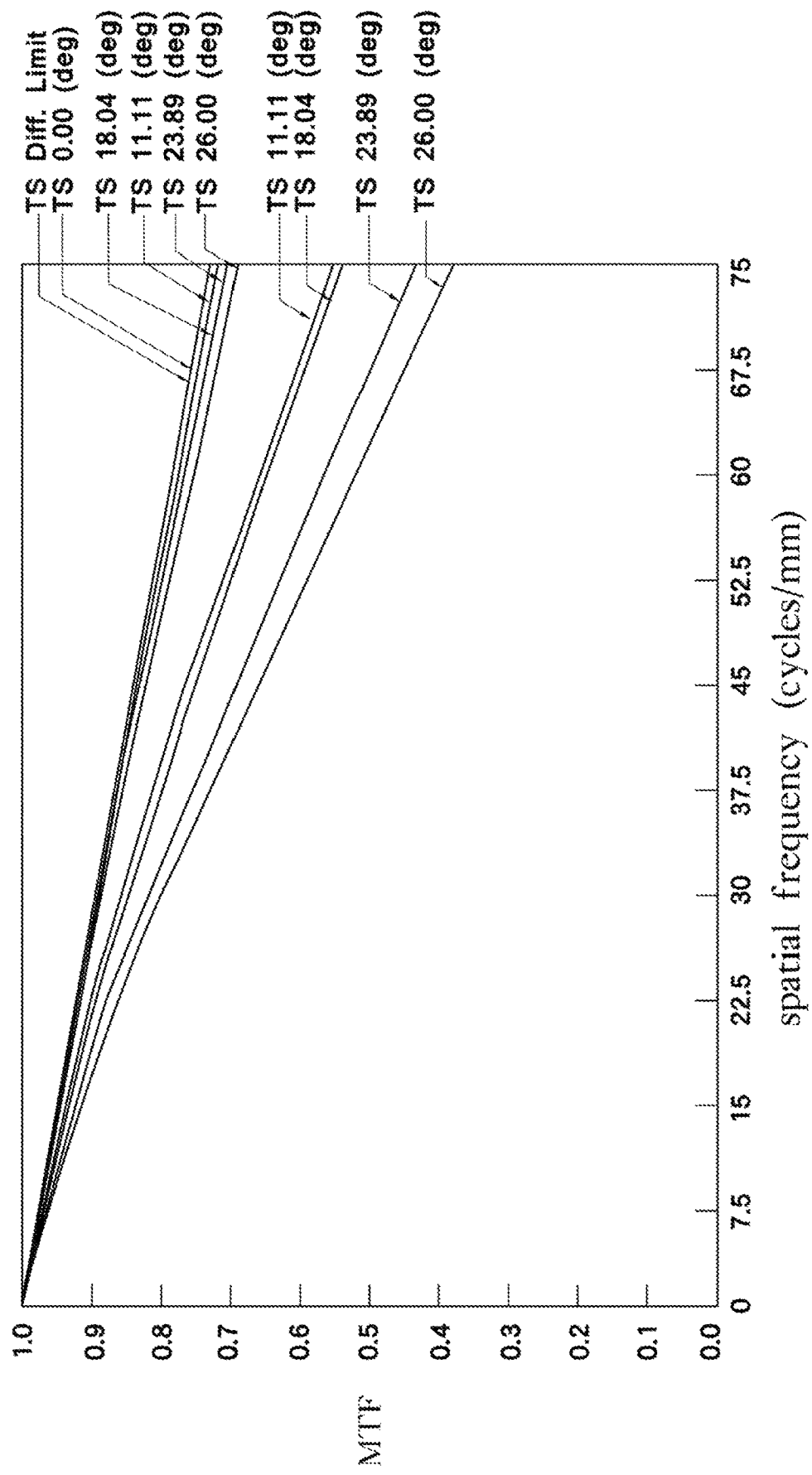
Figure 4A:
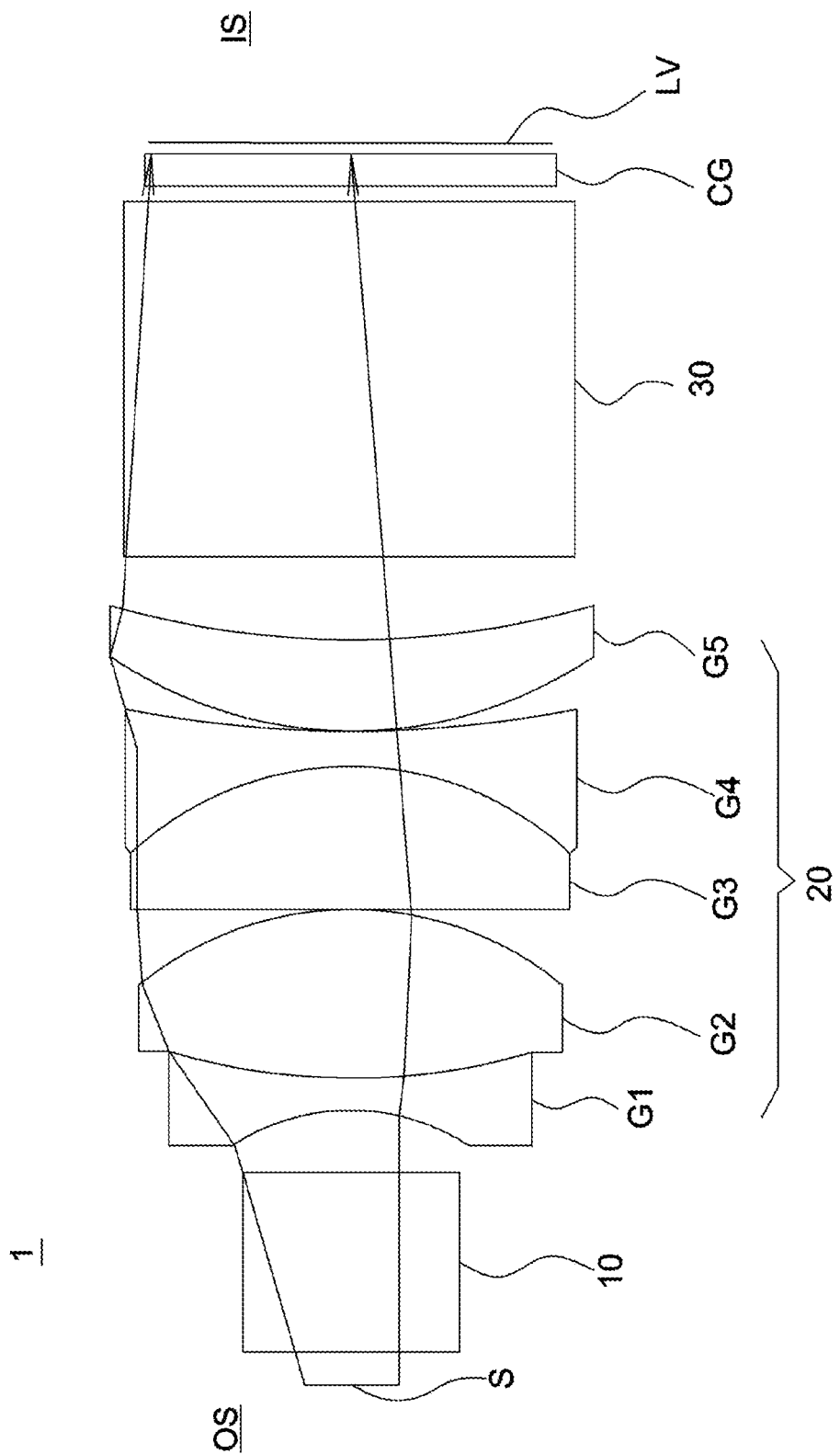
FIGS. 4A and 4B show schematic diagrams illustrating the layout and performance of an optical lens according to a fourth embodiment of the invention.
Figure 4B:
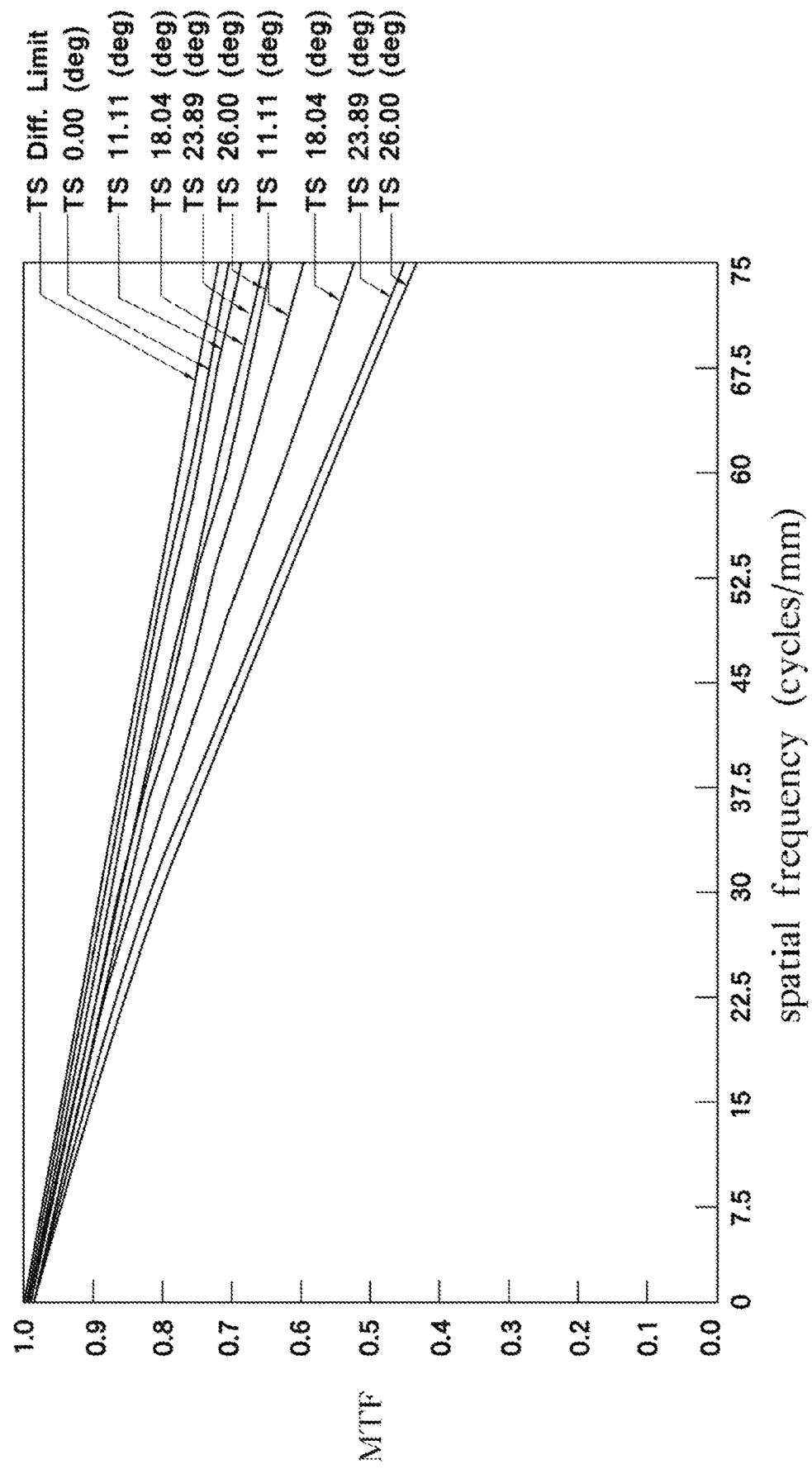
Figure 5A:
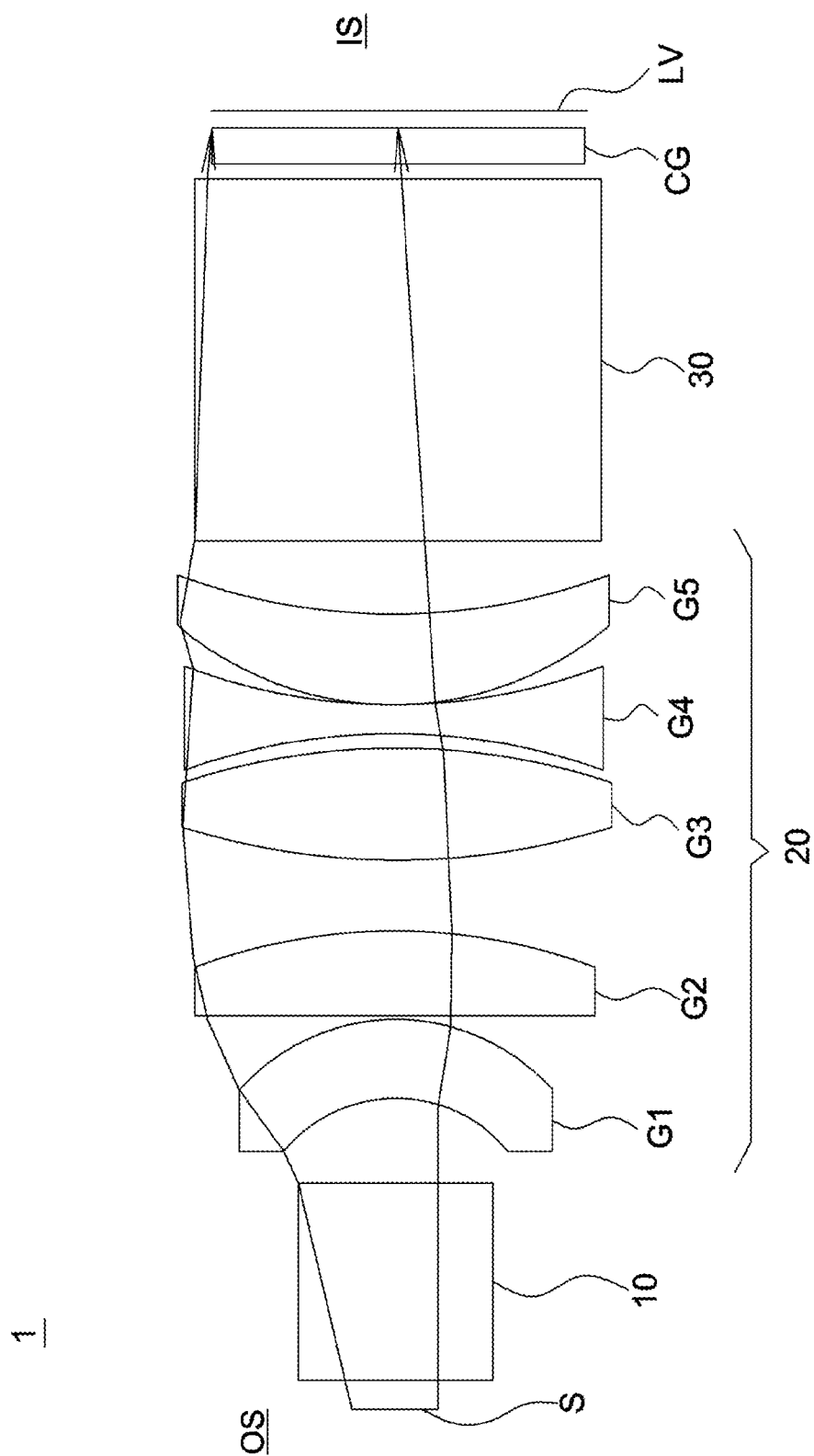
FIGS. 5A and 5B show schematic diagrams illustrating the layout and performance of an optical lens according to a fifth embodiment of the invention.
Figure 5B:
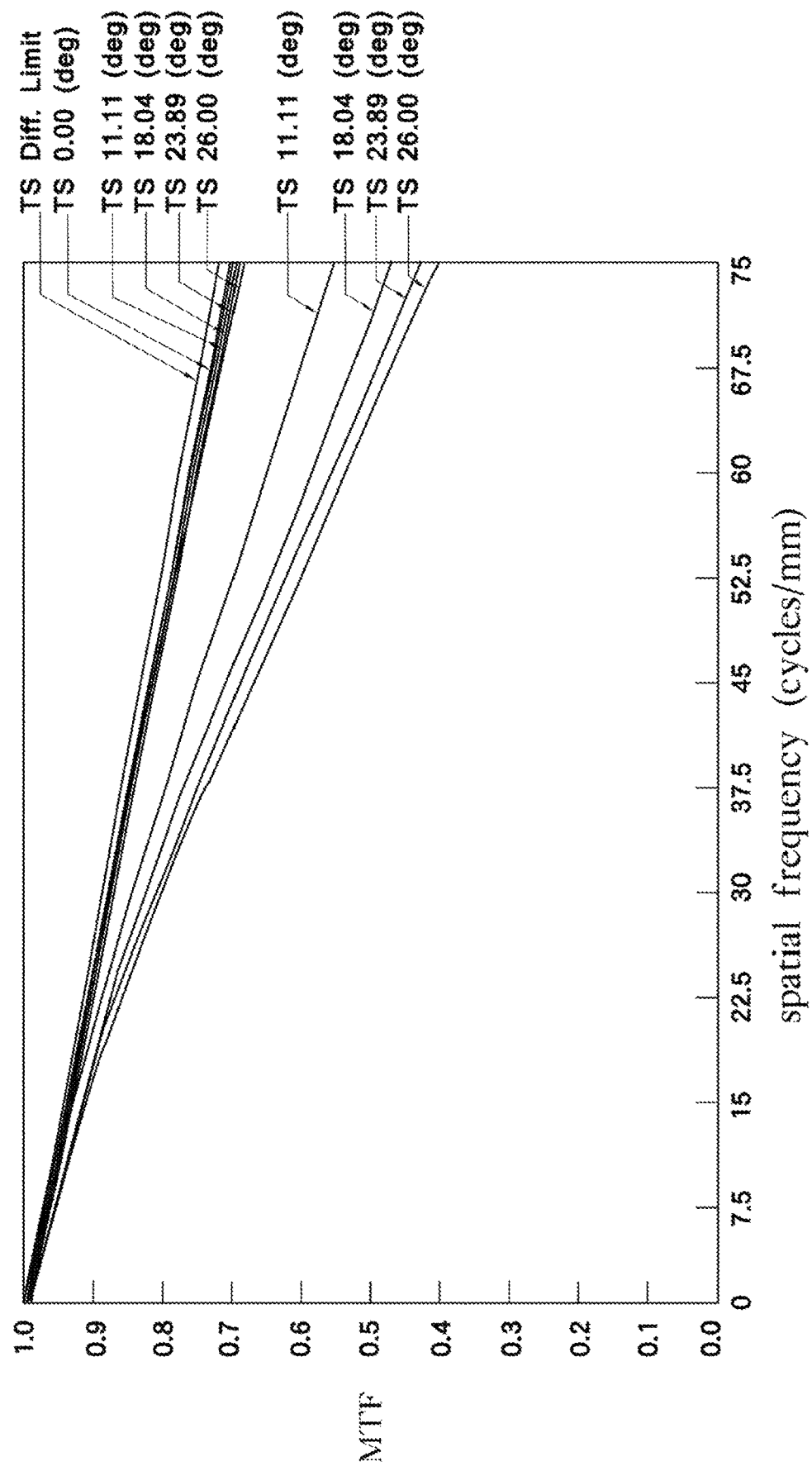
Figure 6A:
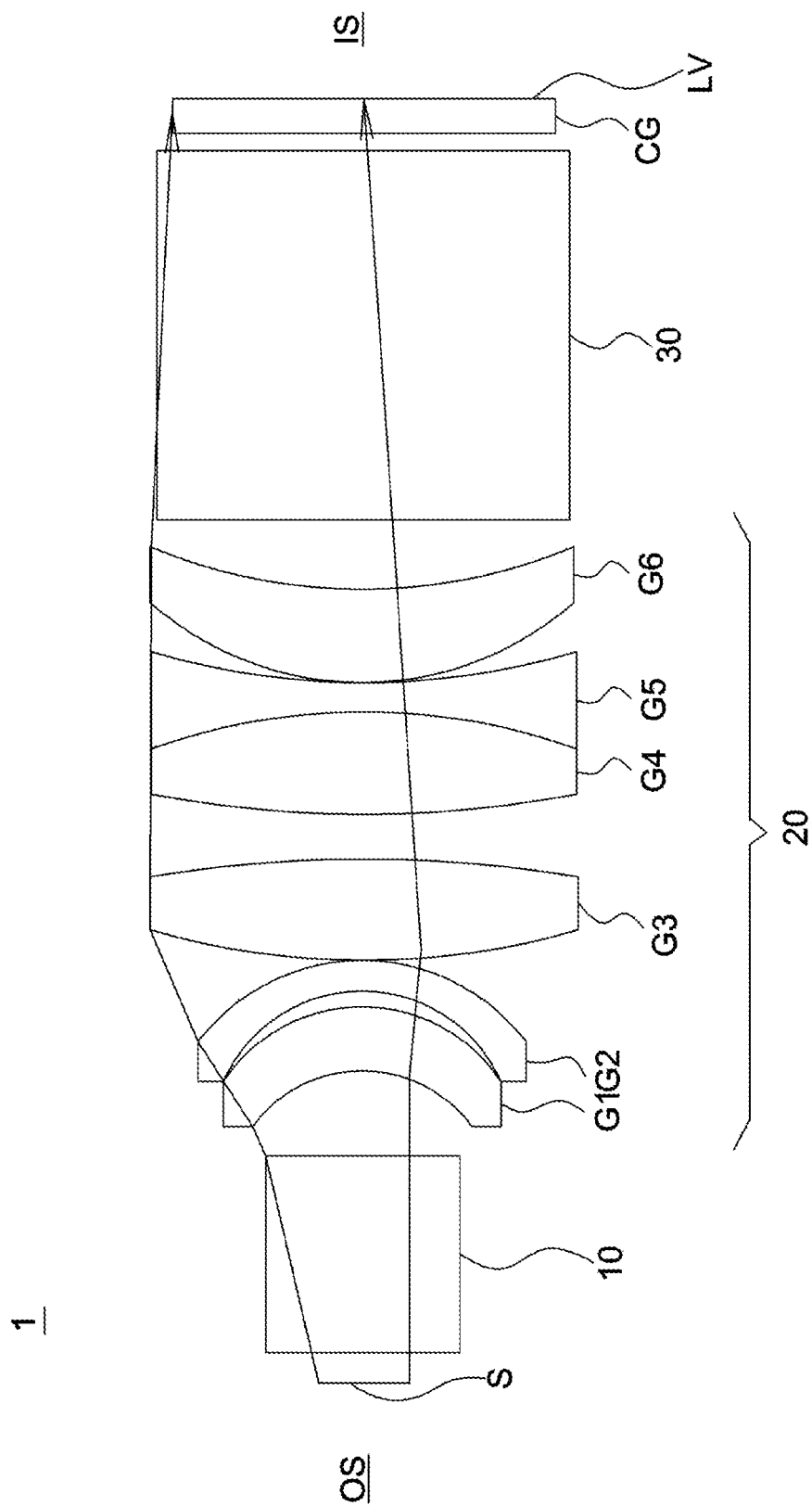
FIGS. 6A and 6B show schematic diagrams illustrating the layout and performance of an optical lens according to a sixth embodiment of the invention.
Figure 6B:
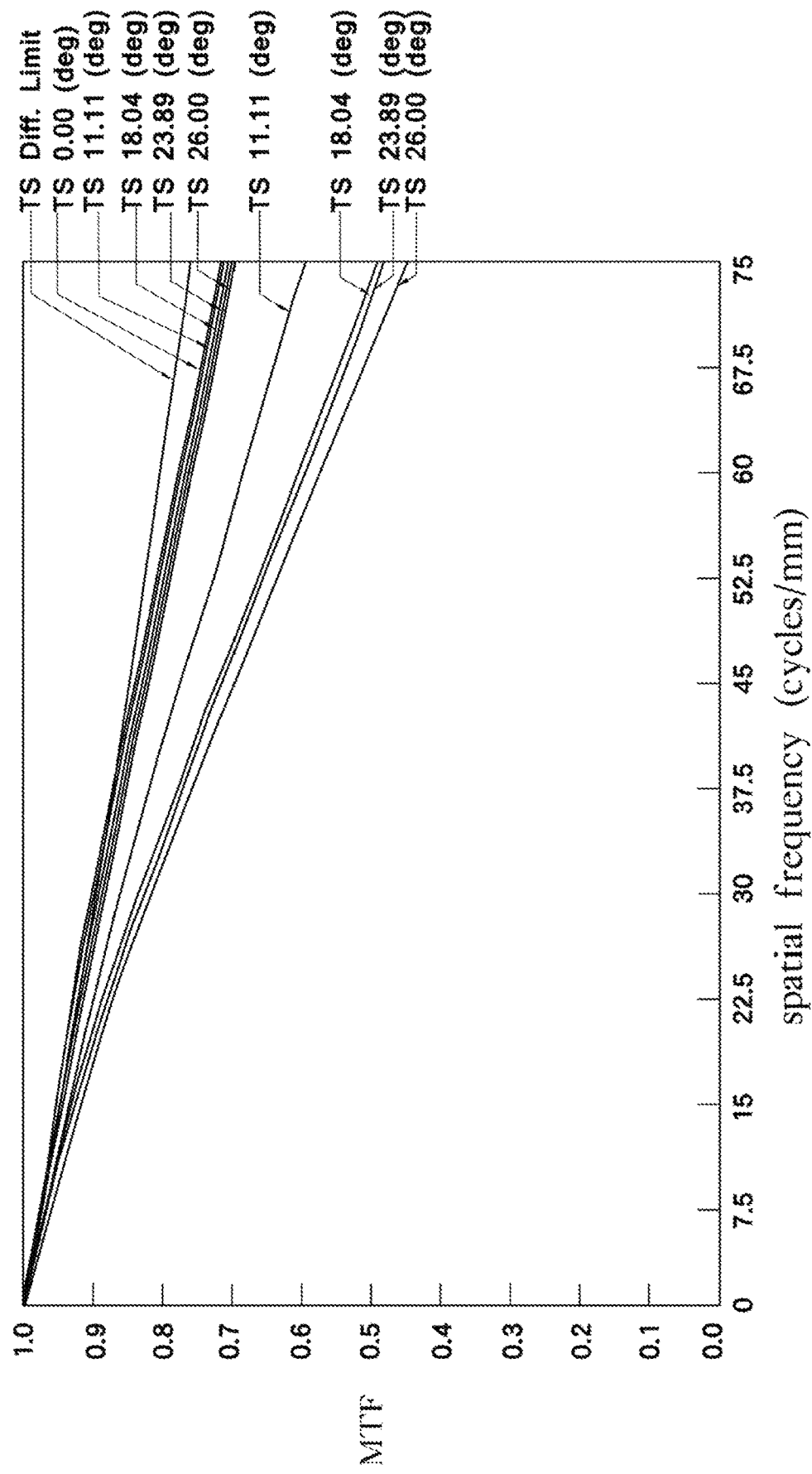
Figure 7A:
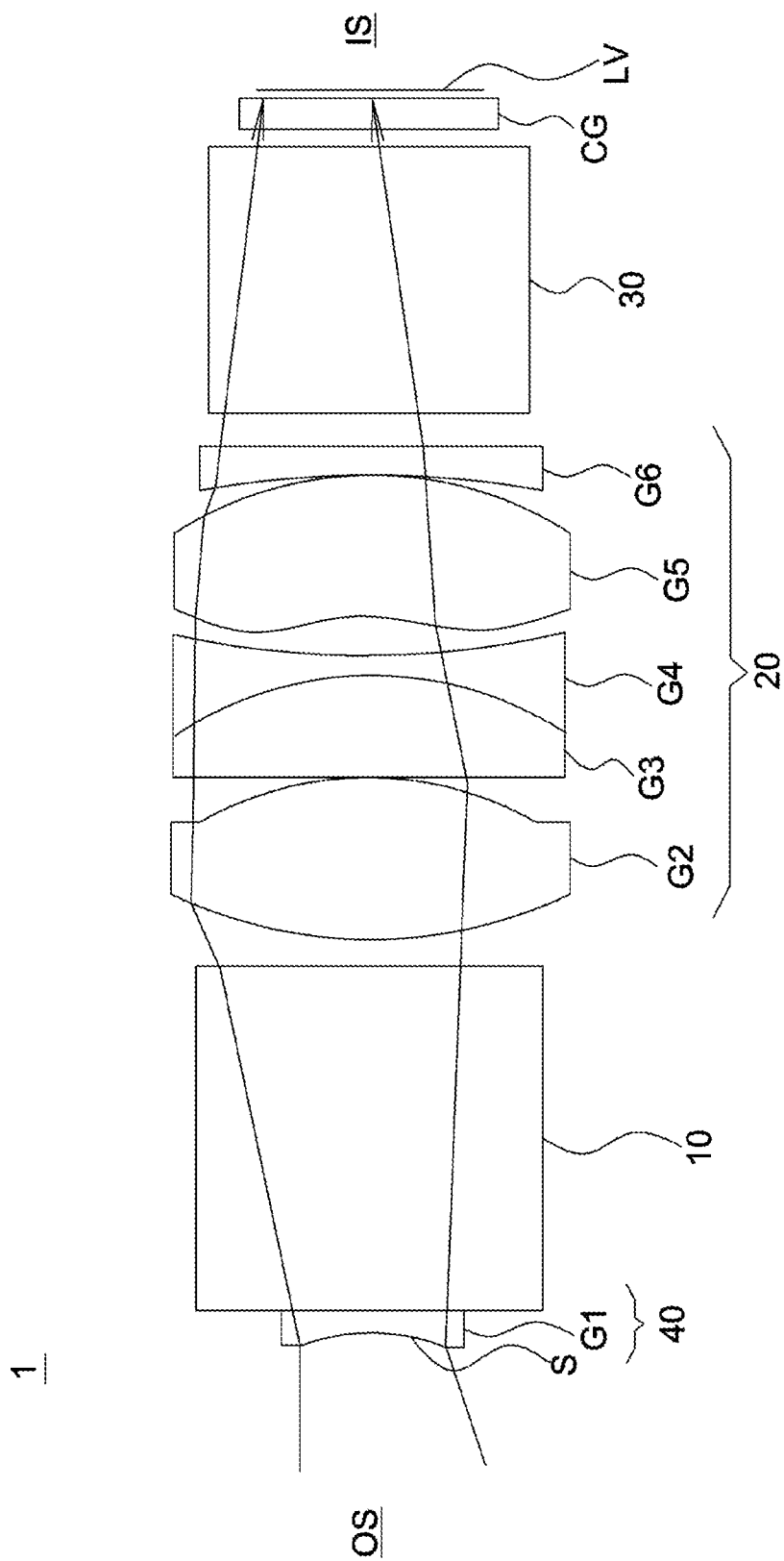
FIGS. 7A and 7B show schematic diagrams illustrating the layout and performance of an optical lens according to a seventh embodiment of the invention.
Figure 7B:
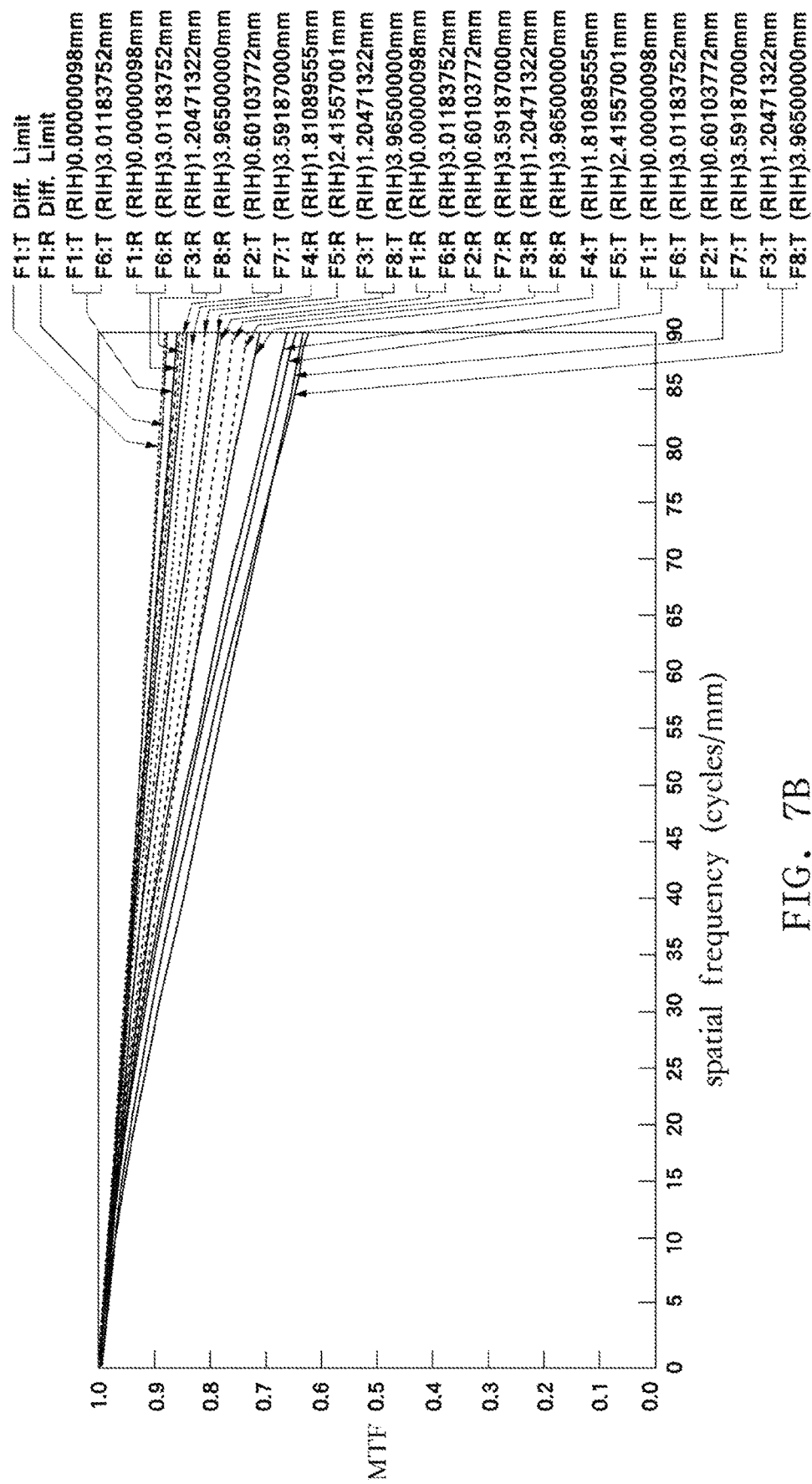
Figure 8A:
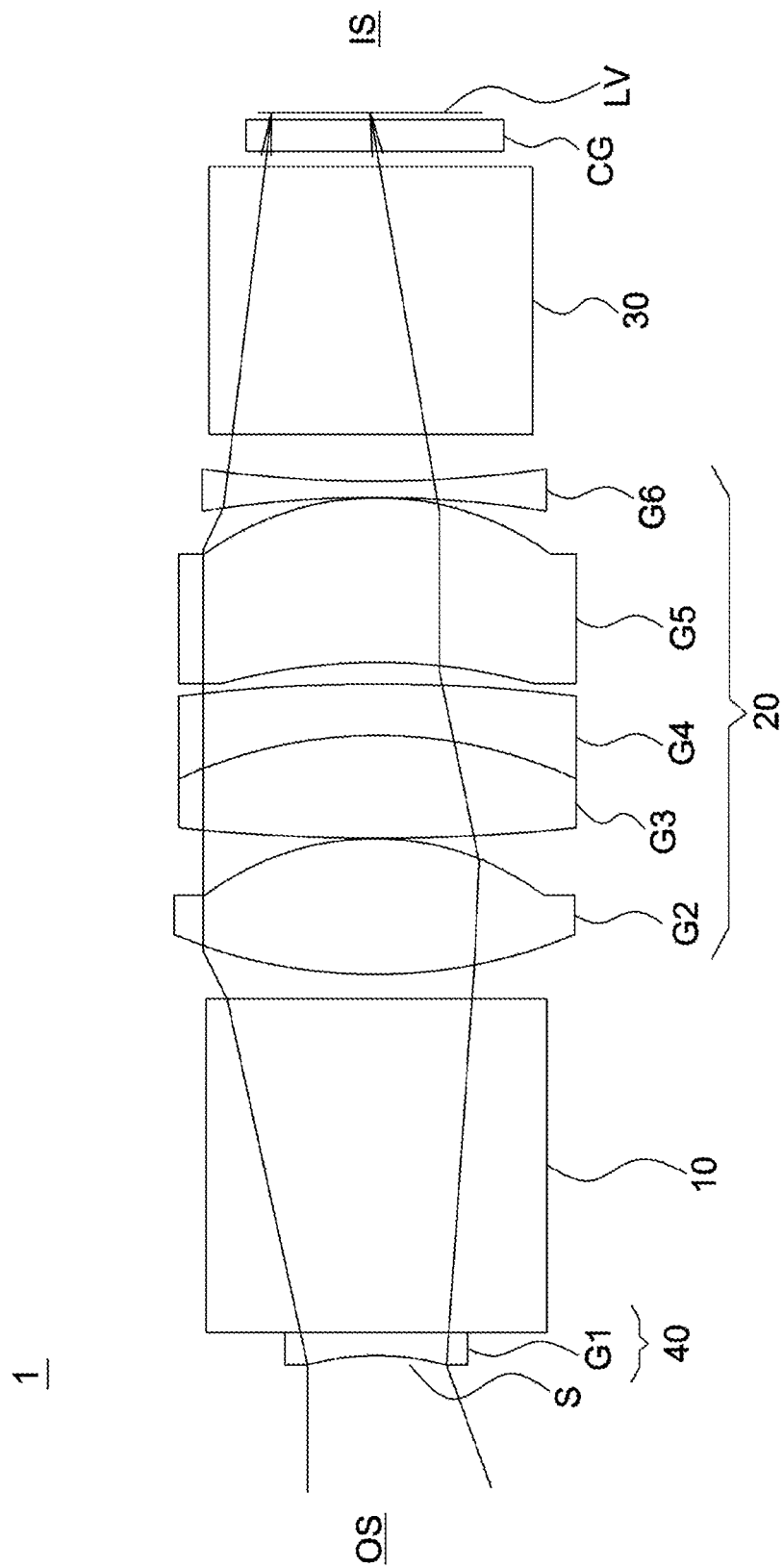
FIGS. 8A and 8B show schematic diagrams illustrating the layout and performance of an optical lens according to an eighth embodiment of the invention.
Figure 8B:
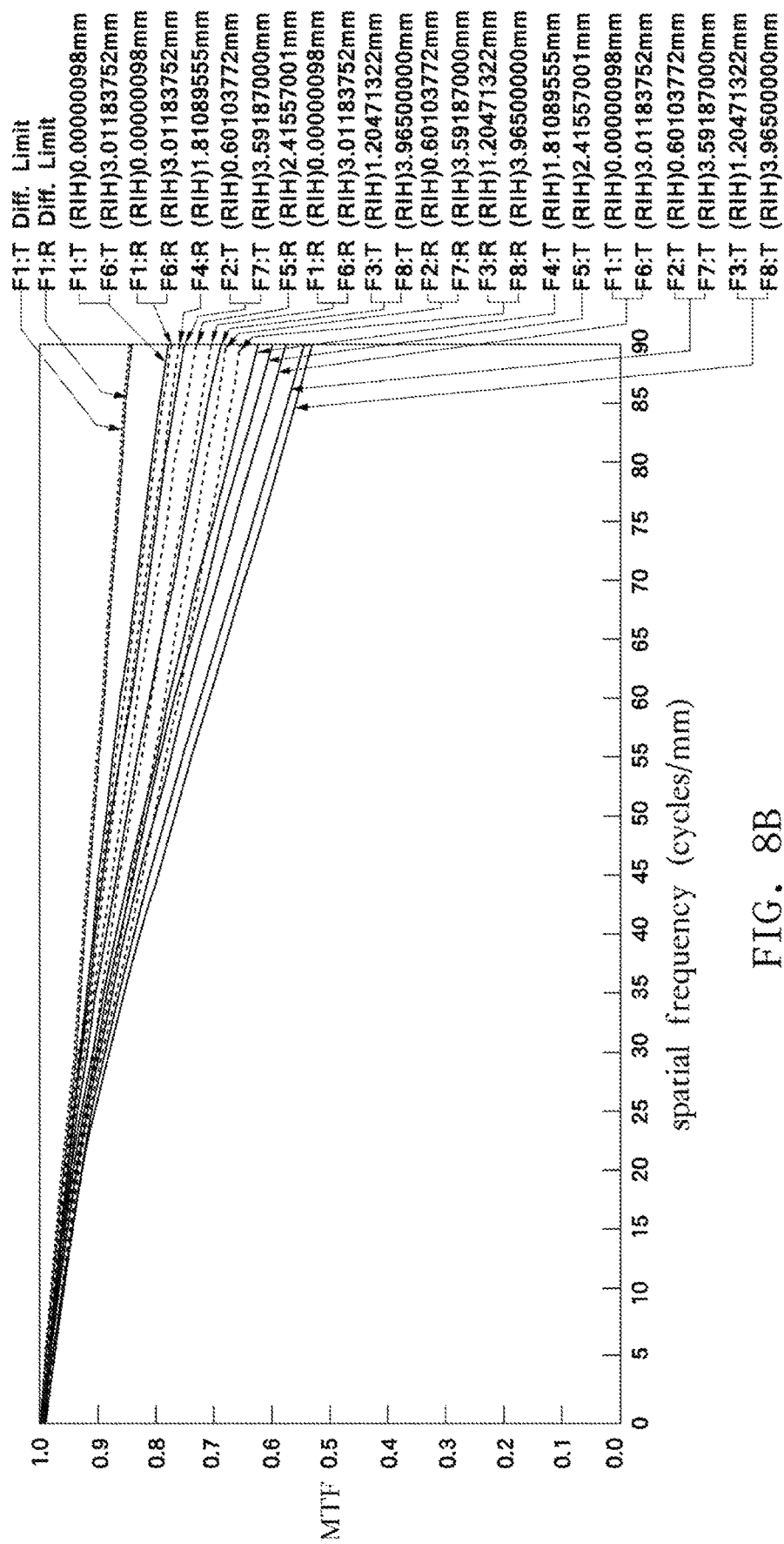
Figure 9A:
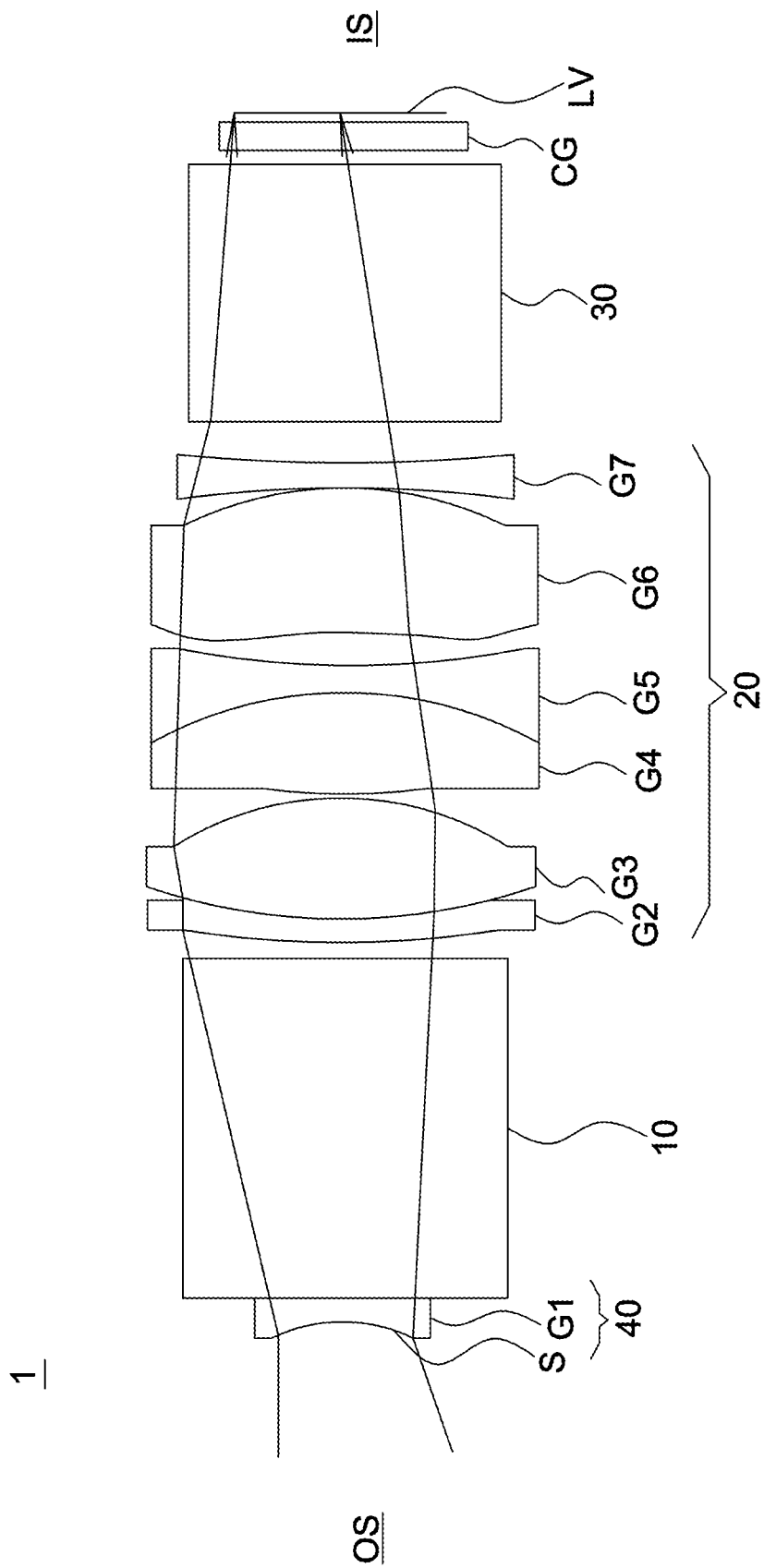
FIGS. 9A and 9B show schematic diagrams illustrating the layout and performance of an optical lens according to a ninth embodiment of the invention.
Figure 9B:
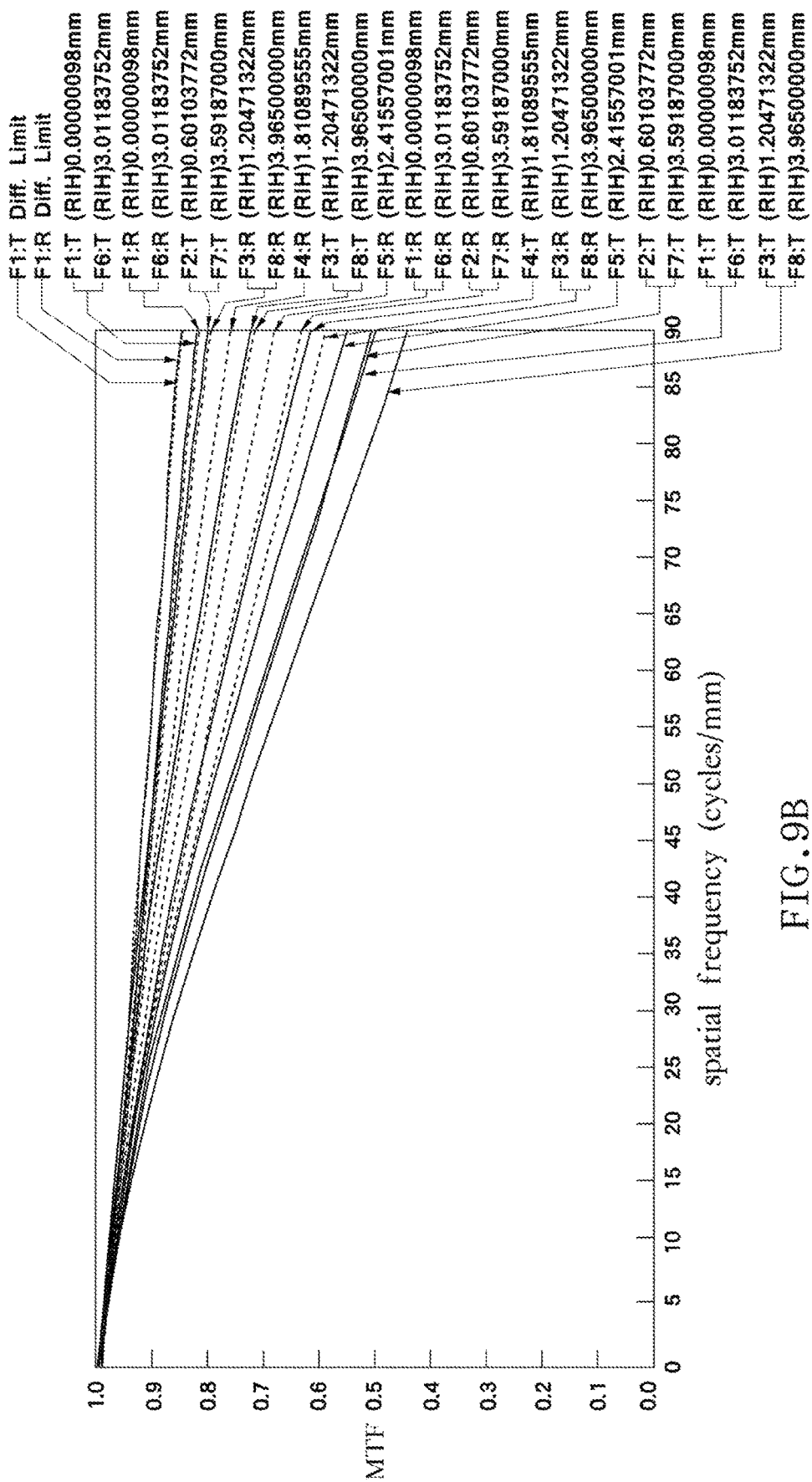
Figure 10A:
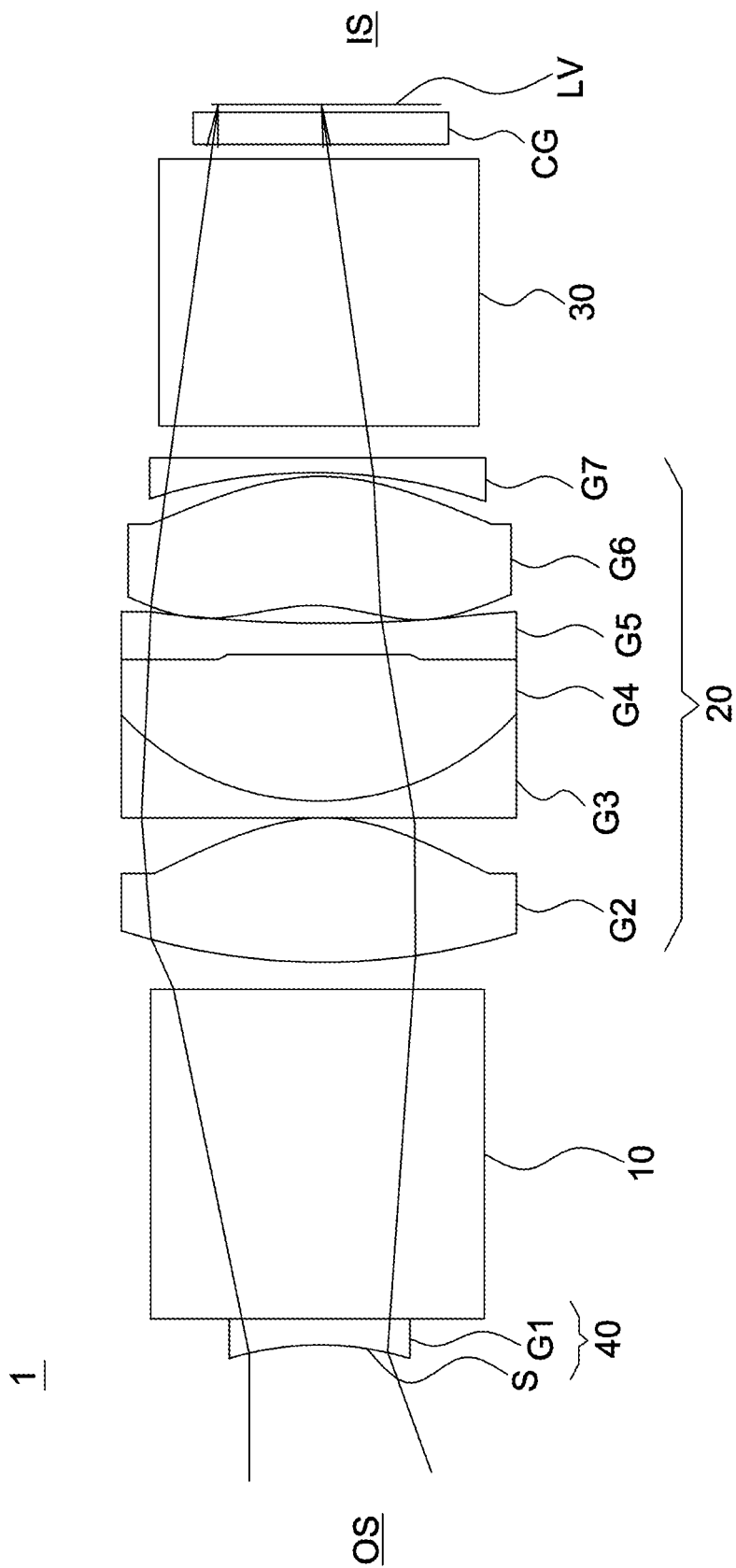
FIGS. 10A and 10B show schematic diagrams illustrating the layout and performance of an optical lens according to a tenth embodiment of the invention.
Figure 10B:
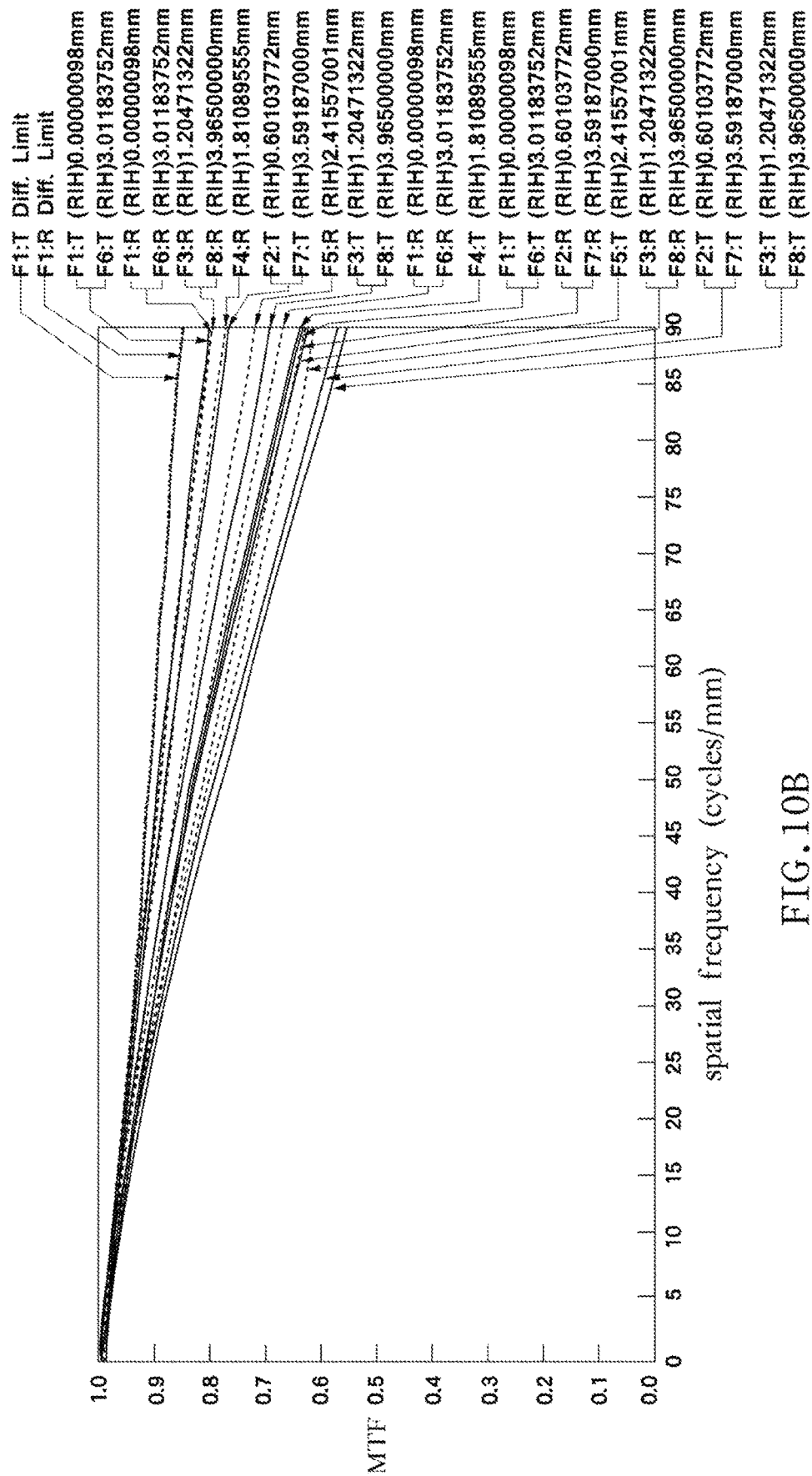
Figure 11A:
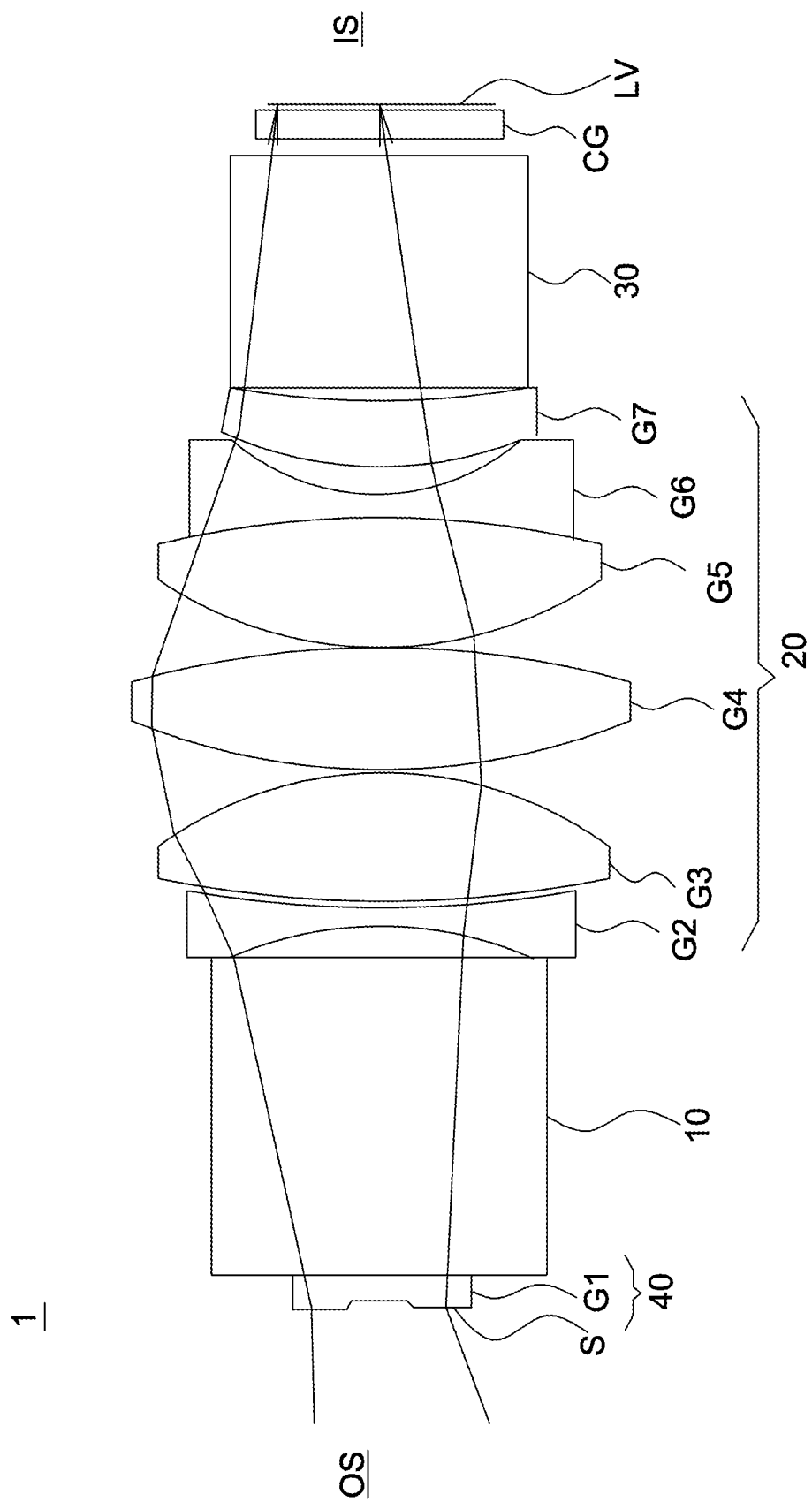
FIGS. 11A and 11B show schematic diagrams illustrating the layout and performance of an optical lens according to an eleventh embodiment of the invention.
Figure 11B:
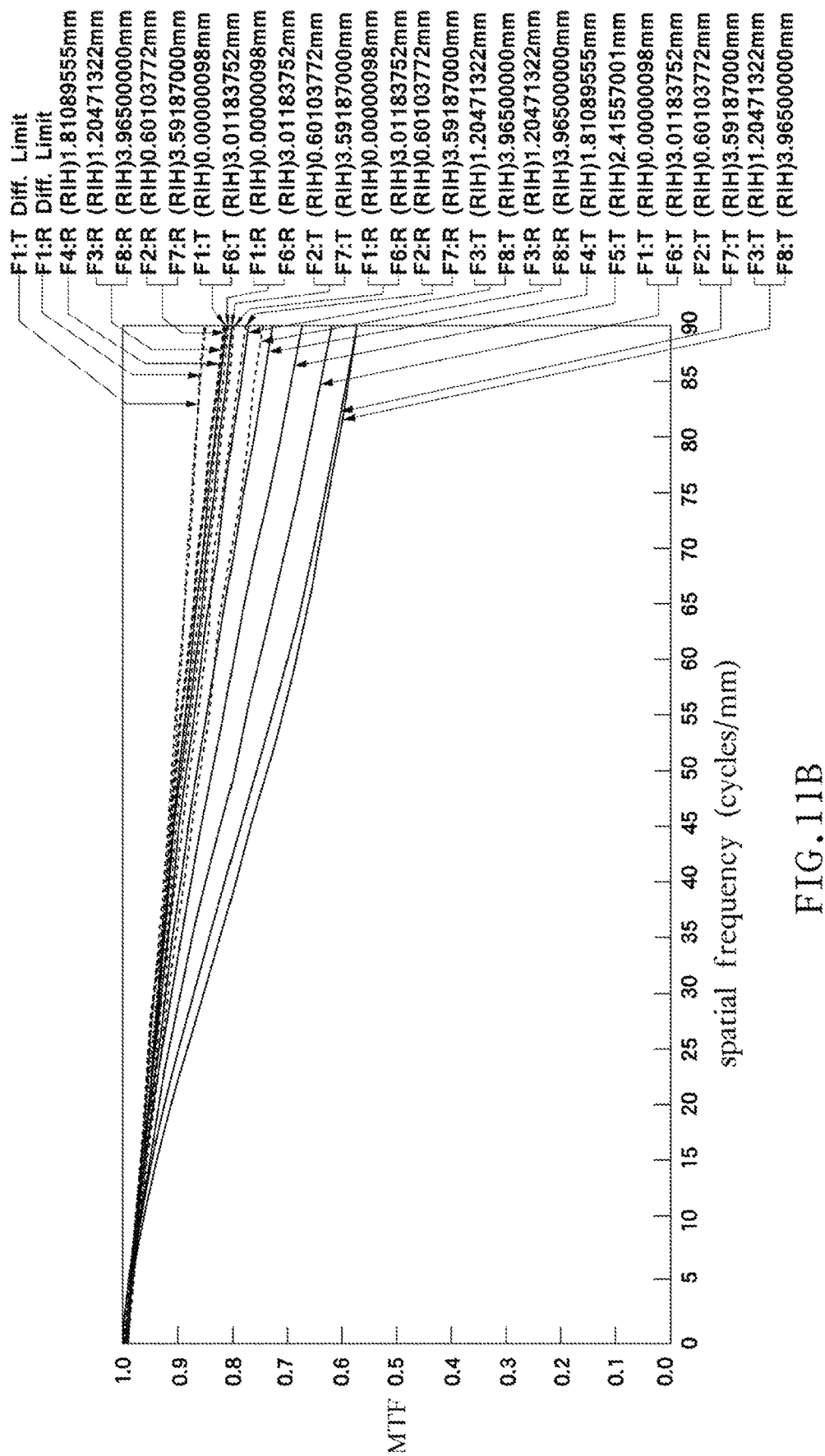
Figure 12A:
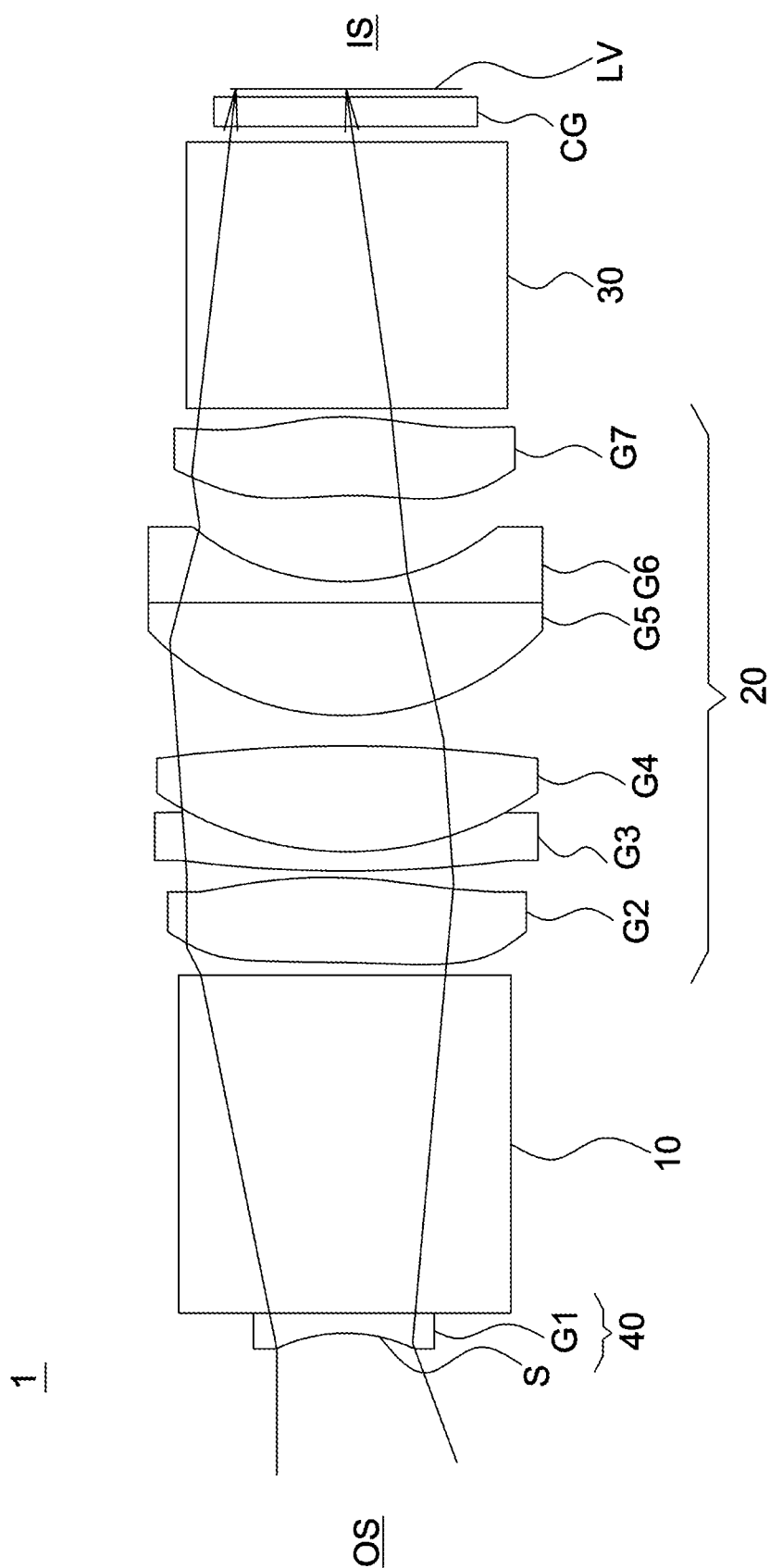
FIGS. 12A and 12B show schematic diagrams illustrating the layout and performance of an optical lens according to a twelfth embodiment of the invention.
Figure 12B:
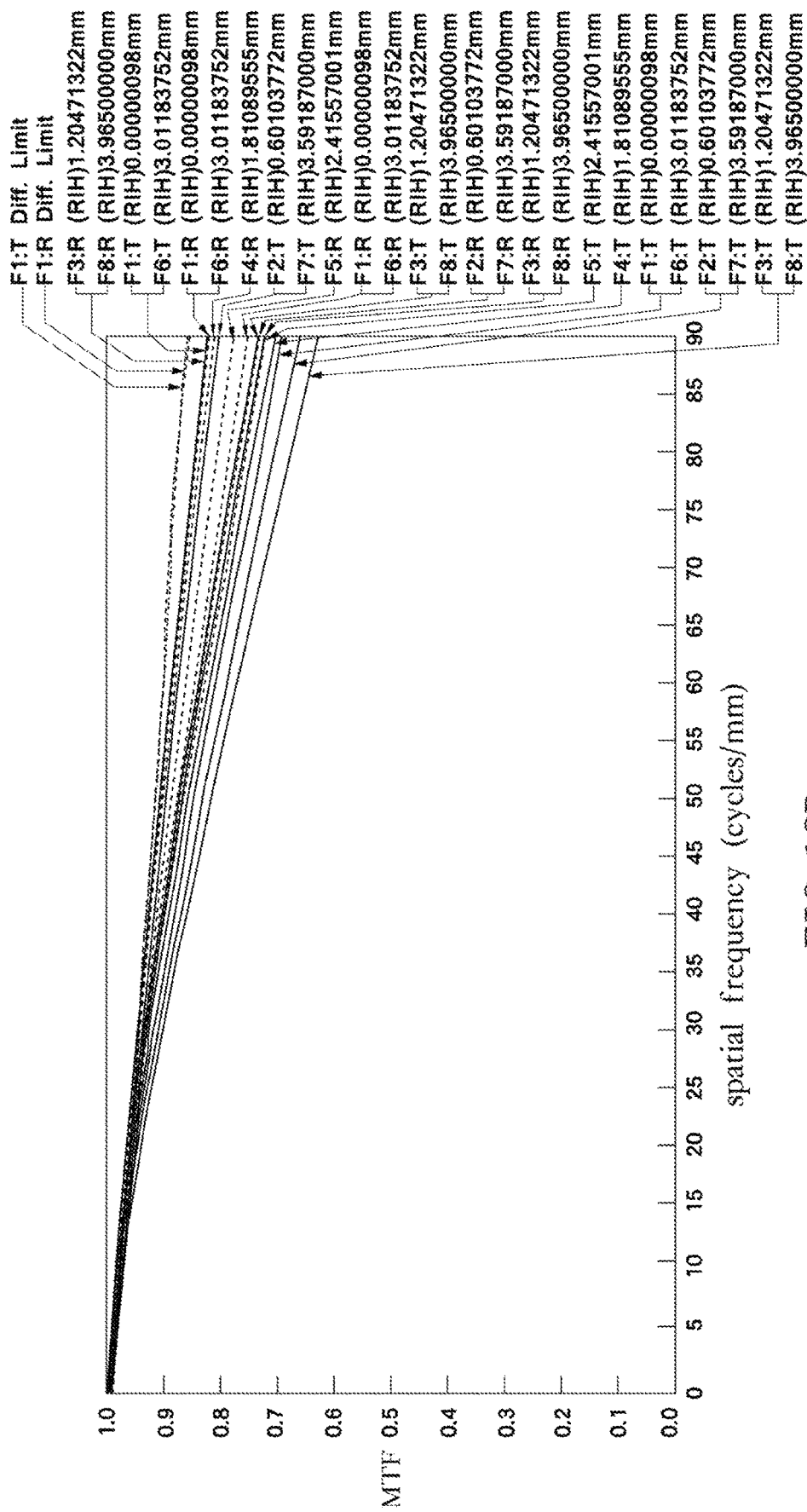
Figure 13A:
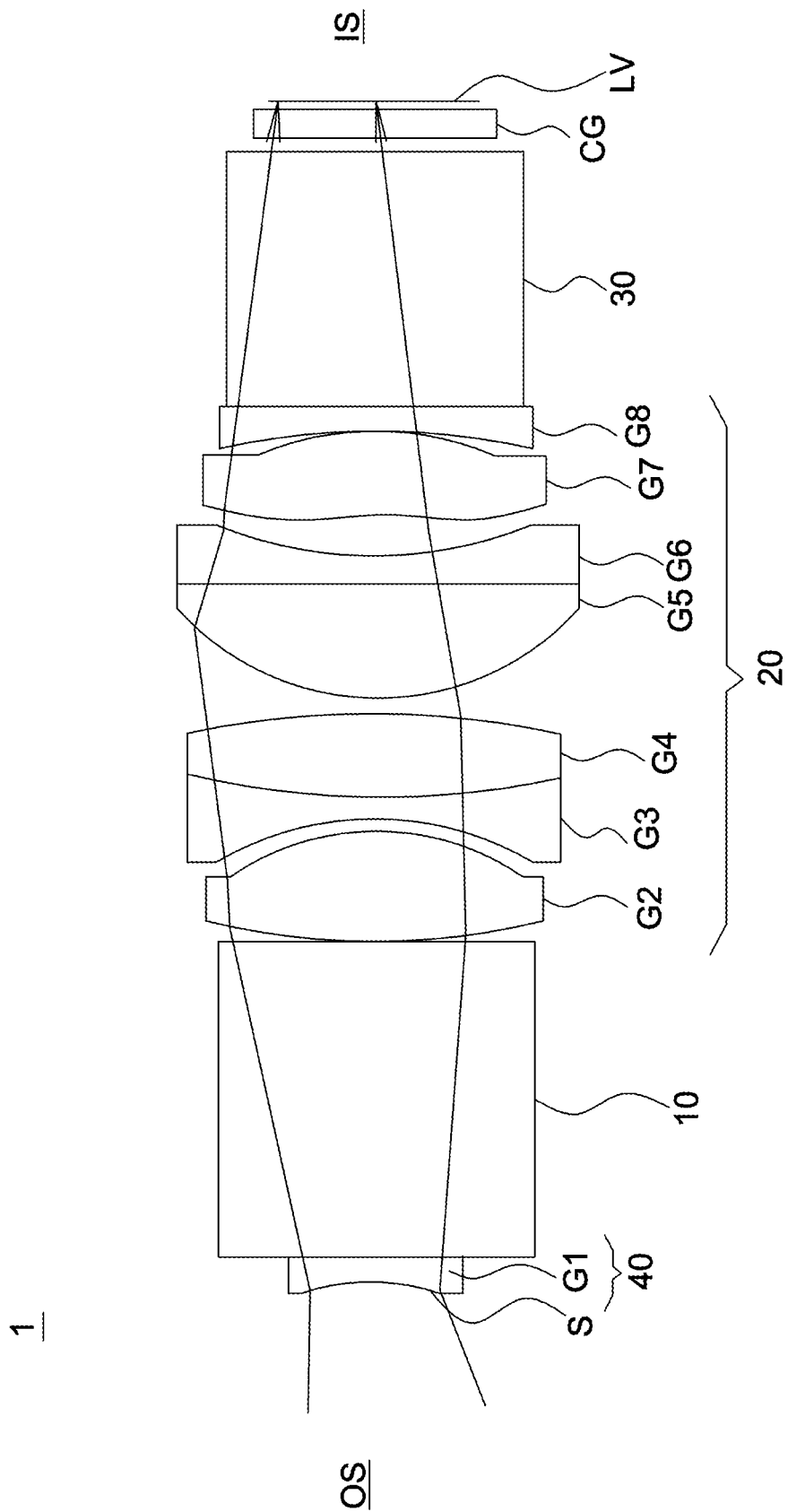
FIGS. 13A and 13B show schematic diagrams illustrating the layout and performance of an optical lens according to a thirteenth embodiment of the invention.
Figure 13B:
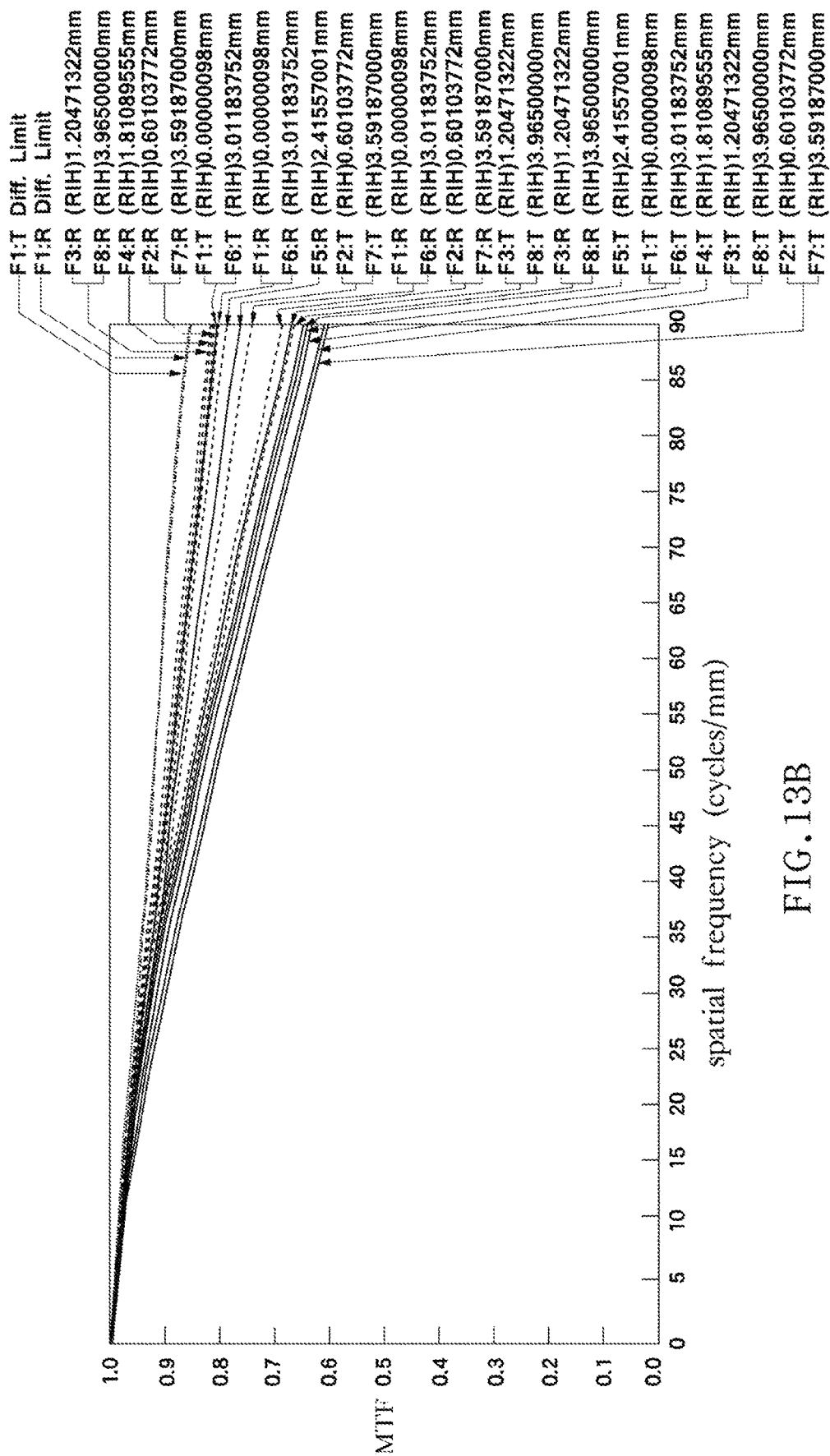

One embodiment of the invention is directed to an optical lens. FIGS. 1A and 1B show schematic diagrams illustrating the layout and performance of an optical lens according to an embodiment of the invention. As shown in FIGS. 1A and 1B, in this embodiment, the optical lens 1 has a lens barrel (not shown), and inside the lens barrel, an aperture stop S, a prism 10, a lens group 20 and a prism 30 are arranged in order from a magnified side to a minified side. When an "item A" and an "item B" are arranged in order from a "C side" to a "D side", the possibility of having other items disposed between item A and item B is not excluded. A light valve LV may be disposed at the minified side of the optical lens 1. The aperture stop S is disposed in an outermost position of the optical lens 1 near the magnified side. Normally, no other lens or optics with refractive power is required between the aperture stop S and an image plane (for example, human eye) on using the optical lens 1. In this embodiment, the magnified side OS of the optical lens 1 possessing the afocal characteristic is located towards a user's eyes, and a minified side IS of the optical lens 1 possessing the telecentric characteristic is located towards the light valve LV. According to various embodiments of the invention, the magnified side OS is the left-hand side, and the minified side IS is the right-hand side of each figure, and thus not repeatedly describing in detail.

The aperture stop S may be an independent component or integrally formed with other optical element. In this embodiment, the aperture stop S may use a mechanic piece to block out peripheral light and transmit central light to achieve aperture effects. The mechanic piece may be adjusted by varying its position, shape or transmittance. In other embodiment, the aperture stop S may be formed by applying an opaque or a light-absorbing material on a lens surface except for a central area to block out peripheral light and transmits central light. The diameter of an aperture stop S may refer to the diameter of the maximum circular area that light can transmit therethrough.

Referring to FIG. 1A again, the prism 10 and prism 30 may, according to their respective positions, refer to as a first prism 10 and a second prism 30. Each of the first prism 10 and the second prism 30 may be a prism assembly having, or formed of, a single prism or multiple prisms. In this embodiment, the second prism 30 is a TIR prism constructed by two adjacent triangular prisms spaced by a tiny gap, and the first prism 10 is a reverse TIR prism constructed by a single prism. Further, in this embodiment, each refractive interface of a prism is a planar surface without refractive power (having zero curvature or an infinity radius of curvature). In other embodiment, at least one refractive interface of a prism is a curved surface with refractive power.

In this embodiment, the lens group 20 includes four lenses arranged along an optical axis and having refractive powers of positive, positive, negative and positive from the magnified side (left side) to the minified side (right side). In this embodiment, all lenses in the lens group 20 are formed of glass, but they can be formed of plastic in other embodiment. In one embodiment, each of the four lenses has a clear aperture of smaller than 14 mm. In another way, all four lenses have a clear aperture of smaller than 14 mm in the embodiment. Further, the overall refractive power of the optical lens 1 is positive.

Each of the lenses in the lens group 20 has a clear aperture (CA). The clear aperture, which is a commonly used term, used herein may refer to a diameter of a len's maximum circular area through which light transmits.

The light valve LV, which is a commonly used device, is a kind of spatial light modulator. The light valve LV is capable of converting illumination beams into image beams and may be a DMD, an LCD, an LCOS, etcetera. In this embodiment, the light valve LV is a DMD.

Design parameters of lenses and surrounding components of the optical lens 1 are listed in Table 1. The design data listed in the following are not intended to limit the invention. Accordingly, many modifications and variations on the parameters or settings without departing from the spirit of the invention or essential characteristics thereof will be apparent to practitioners skilled in this art.

TABLE 1

F/# = 5; Dmax = 12.56(mm); EFL = 12.75 (mm); TTL = 22.82 (mm); FOV = 52 degrees (diagonal line); TTL/Ds = 8.91;

| surface | curvature (mm) | interval (mm) | refractive index | Abbe number | semi-diameter (mm) | object description |
|---|---|---|---|---|---|---|
| S1 | 0 | 1.00 | | | 1.28 | aperture stop S |
| S2 | 0 | 5.60 | 1.52 | 64.14 | 1.61 | first prism 10 |
| S3 | 0 | 2.31 | | | 2.99 | |
| S4* | −0.201 | 3.89 | 1.81 | 40.29 | 3.38 | G1 |
| S5* | −0.163 | 0.10 | | | 5.16 | |
| S6 | 0.067 | 3.09 | 1.88 | 40.77 | 6.26 | G2 |
| S7 | −0.011 | 2.22 | | | 6.15 | |
| S8 | −0.035 | 1.00 | 1.92 | 18.90 | 5.77 | G3 |
| S9 | 0.086 | 0.10 | | | 5.75 | |
| S10* | 0.092 | 3.51 | 1.81 | 40.29 | 6.03 | G4 |
| S11* | −0.012 | 2.00 | | | 6.15 | |
| S12 | 0 | 11.00 | 1.72 | 29.49 | 6.01 | second prism 30 |
| S13 | 0 | 0.50 | | | 5.60 | |
| S14 | 0 | 1.00 | 1.52 | 64.14 | 5.57 | cover glass CG |
| S15 | 0 | 0.30 | | | 5.52 | |
| S16 | — | — | — | — | — | light valve LV |

In the above table, the surface denoted by an asterisk is an aspheric surface, and a surface without the denotation of an asterisk is a spherical surface.

The curvature is a reciprocal of the radius of curvature. When the curvature is positive, the center of a lens surface is located towards the minified side. When the curvature is negative, the center of a lens surface is located towards the magnified side. The concavity and convexity of each lens surface is listed in the above table and shown in corresponding figures. In this embodiment, the refractive powers of the lenses G1-G4 are positive, positive, negative and positive, respectively. The semi-diameter is half of the clear aperture (CA) of the optical surface.

The Symbol F/# shown in the above table is an aperture value of the aperture stop.

The Symbol Ds shown in the above table is a diameter of the aperture stop, which is a double of a semi-diameter of the aperture stop.

In the embodiments of the invention, an effective focal length of the optical lens is denotes as "EFL", as shown in the above table.

In the embodiments of the invention, a total track length of the optical lens is denotes as "TTL", as shown in the above table. Specifically, the total track length TTL is a distance along the optical axis between an aperture stop S and a lens surface nearest the minified side of lenses (or surface furthest from the aperture stop) in the lens group. In this embodiment, the total track length TTL is a distance along the optical axis measured from a first optical surface S1 (aperture stop S) nearest the magnified side OS to a surface S11 of the last lens G4 with refractive power in the lens group facing the minified side 4, as shown in the above table. In this embodiment, the optical surface may be a surface of an aperture stop, a lens, a prism, etcetera.

In this embodiment, when the optical lens is used in a projection system, the FOV denoted in the above table is a field of view measured diagonally.

In the following design examples of the invention, each aspheric surface satisfies the following equation:

$$x = \frac{c'y^2}{1+\sqrt{1-(1+k)c'^2 y^2}} + Ay^4 + By^6 + Cy^8 + Dy^{10} + Ey^{12} + Fy^{14} + Gy^{16}\ldots,$$

where x denotes a sag of an aspheric surface along the optical axis, c' denotes a reciprocal of a radius of an osculating sphere, k denotes a Conic constant, y denotes a height of the aspheric surface measured in a direction perpendicular to the optical axis, and A-G are aspheric coefficients of each order. Table 2 lists aspheric coefficients and conic constant of each aspheric surface of the optical lens according to a first embodiment of the invention.

TABLE 2

| | K | A | B | C | D |
|---|---|---|---|---|---|
| S4 | 0 | −6.22E−04 | 3.33E−05 | −1.21E−06 | −3.32E−07 |
| S5 | 0 | −8.34E−06 | 4.39E−06 | −2.95E−08 | −4.70E−09 |
| S10 | 0 | 3.82E−04 | −1.82E−05 | 2.59E−07 | −2.35E−09 |
| S11 | 0 | 4.52E−04 | −1.92E−05 | 2.89E−07 | −2.83E−09 |

Further, in this embodiment, a ratio of a total track length TTL of the optical lens 1 to a diameter Ds of the aperture stop S (TTL/Ds) is 8.91. It may produce the effect of space saving when the ratio of TTL/Ds ranges from 2 to 12. Such effect is more significant when the ratio of TTL/Ds ranges from 2 to 5 or 7 to 11, and is most significant when the ratio of TTL/Ds ranges from 3 to 5 or 8 to 10. The effect of space saving may, for example, allow for better optical performance in a limited space when the optical lens 1 is installed in a portable electronic device.

In other embodiment, the first prism 10 and second prism 30 may be optionally omitted from the optical lens or replaced by other optics such as a reflective mirror, a dichroic mirror, a polarizing beam splitter, etcetera. Further, except for the afore-mentioned lenses, the components having the surfaces S12-S16 may be individually or entirely integrated inside the lens barrel to form a part of the optical lens.

A design example of an optical lens according to a second embodiment of the invention is described below. In this embodiment, design parameters of lenses and surrounding components of the second embodiment are listed in Table 3.

TABLE 3

F/# = 5; Dmax = 12.92(mm); EFL = 13.11 (mm);
TTL = 23.34 (mm); FOV = 52 degrees (diagonal line); TTL/Ds = 8.84;

| surface | curvature (mm) | interval (mm) | refractive index | Abbe number | semi-diameter (mm) | object description |
|---|---|---|---|---|---|---|
| S1 | 0 | 1.00 | — | — | 1.32 | aperture stop S |
| S2 | 0 | 5.60 | 1.52 | 64.14 | 1.52 | first prism 10 |
| S3 | 0 | 2.39 | — | — | 2.65 | |
| S4 | −0.218 | 1.00 | 1.50 | 81.55 | 3.05 | G1 |
| S5 | −0.090 | 0.10 | — | — | 4.10 | |
| S6 | −0.047 | 3.30 | 1.81 | 40.29 | 4.22 | G2 |
| S7* | −0.145 | 1.43 | — | — | 5.03 | |
| S8 | 0.030 | 4.10 | 1.85 | 40.78 | 5.78 | G3 |
| S9 | −0.098 | 1.00 | 1.81 | 22.76 | 5.82 | G4 |
| S10 | 0.062 | 0.23 | — | — | 5.82 | |
| S11* | 0.113 | 3.18 | 1.69 | 52.75 | 6.46 | G5 |
| S12* | 0.059 | 2.26 | — | — | 6.14 | |
| S13 | 0 | 11.00 | 1.72 | 29.49 | 6.06 | second prism 30 |
| S14 | 0 | 0.50 | — | — | 5.61 | |
| S15 | 0 | 1.00 | 1.52 | 64.14 | 5.57 | cover glass CG |
| S16 | 0 | 0.30 | — | — | 5.53 | |
| S17 | — | — | — | — | — | light valve LV |

Table 4 lists aspheric coefficients and conic constant of each aspheric surface of the optical lens according to the second embodiment of the invention.

TABLE 4

| | K | A | B | C | D |
|---|---|---|---|---|---|
| S7 | 0 | 2.38E−04 | −2.14E−06 | 6.28E−08 | 2.56E−09 |
| S11 | 0 | 4.38E−04 | −2.47E−05 | 3.76E−07 | −1.86E−09 |
| S12 | 0 | 5.98E−04 | −3.51E−05 | 6.31E−07 | −3.13E−09 |

As shown in Table 3 and table 4, in this embodiment, the refractive powers of the lenses G1-G5 are negative, positive, positive, negative and positive, respectively. Further, the main difference between the second embodiment and the first embodiment is that the optical lens 1 of the second embodiment has one more lens as compared with the first embodiment, and that the lenses G3 and G4 are combined to form a cemented doublet. In this embodiment, each lens in lens group 20 is formed of glass, and the overall refractive power of the optical lens 1 is positive.

A design example of an optical lens according to a third embodiment of the invention is described below. In this embodiment, design parameters of lenses and surrounding components of the third embodiment are listed in Table 5.

TABLE 5

F/# = 5; Dmax = 14.04; EFL = 12.69 (mm);
TTL = 22.88 (mm); FOV = 52 degrees (diagonal line); TTL/Ds = 8.94;

| surface | curvature (mm) | interval (mm) | refractive index | Abbe number | semi-diameter (mm) | object description |
|---|---|---|---|---|---|---|
| S1 | 0 | 1.00 | — | — | 1.28 | aperture stop S |
| S2 | 0 | 5.60 | 1.52 | 64.14 | 1.61 | first prism 10 |
| S3* | 0 | 2.52 | — | — | 2.82 | |
| S4* | −0.257 | 1.93 | 1.81 | 40.29 | 3.26 | G1 |
| S5* | −0.231 | 0.71 | — | — | 3.98 | |

TABLE 5-continued

F/# = 5; Dmax = 14.04; EFL = 12.69 (mm);
TTL = 22.88 (mm); FOV = 52 degrees (diagonal line); TTL/Ds = 8.94;

| surface | curvature (mm) | interval (mm) | refractive index | Abbe number | semi-diameter (mm) | object description |
|---|---|---|---|---|---|---|
| S6 | −0.235 | 1.00 | 1.76 | 27.51 | 4.02 | G2 |
| S7 | −0.167 | 0.10 | — | — | 5.01 | |
| S8* | 0.032 | 3.79 | 1.81 | 40.29 | 6.99 | G3 |
| S9* | −0.061 | 0.78 | — | — | 7.02 | |
| S10 | 0.083 | 4.46 | 1.50 | 81.55 | 6.72 | G4 |
| S11 | −0.045 | 1.00 | 1.92 | 18.90 | 6.33 | G5 |
| S12 | 0.034 | 2.72 | — | — | 6.01 | |
| S13 | 0 | 11.00 | 1.72 | 29.49 | 5.92 | second prism 30 |
| S14 | 0 | 0.50 | — | — | 5.58 | |
| S15 | 0 | 1.00 | 1.52 | 64.14 | 5.55 | cover glass CG |
| S16 | 0 | 0.30 | — | — | 5.52 | |
| S17 | — | — | — | — | — | light valve LV |

Table 6 lists aspheric coefficients and conic constant of each aspheric surface of the optical lens according to the third embodiment of the invention.

TABLE 6

| | K | A | B | C | D |
|---|---|---|---|---|---|
| S4 | 0 | −1.51E−04 | 5.07E−05 | 2.02E−05 | −4.14E−07 |
| S5 | 0 | −4.81E−04 | 3.49E−05 | 1.10E−06 | 1.63E−07 |
| S8 | 0 | −2.19E−04 | 1.00E−05 | −1.08E−07 | 6.08E−10 |
| S9 | 0 | 2.80E−05 | −4.29E−06 | 1.71E−07 | −9.72E−10 |

As shown in the above two tables, the main difference between the third embodiment and the first embodiment is that the optical lens 1 of the third embodiment has five lenses G1-G5, and the refractive powers of the lenses G1-G5 are positive, negative, positive, positive and negative, respectively. Further, the lenses G4 and G5 are combined to form a cemented doublet. In this embodiment, each lens in lens group 20 is formed of glass, and the overall refractive power of the optical lens 1 is positive.

A design example of an optical lens according to a fourth embodiment of the invention is described below. In this embodiment, design parameters of lenses and surrounding components of the fourth embodiment are listed in Table 7.

TABLE 7

F/# = 5; Dmax = 6.4; EFL = 12.66 (mm);
TTL = 23.1 (mm); FOV = 52 degrees (diagonal line); TTL/Ds = 9.023;

| surface | curvature (mm) | interval (mm) | refractive index | Abbe number | semi-diameter (mm) | object description |
|---|---|---|---|---|---|---|
| S1 | 0 | 1.00 | | | 1.28 | aperture stop S |
| S2 | 0 | 5.60 | 1.52 | 64.14 | 1.60 | first prism 10 |
| S3 | 0 | 1.90 | | | 2.82 | |
| S4 | −0.19 | 1.00 | 1.49 | 70.24 | 3.18 | G1 |
| S5 | 0.07 | 4.99 | 1.81 | 40.29 | 4.86 | G2 |
| S6* | −0.13 | 0.10 | | | 5.59 | |
| S7 | 0.02 | 4.60 | 1.74 | 49.34 | 5.77 | G3 |
| S8 | −0.13 | 1.00 | 1.81 | 22.76 | 5.78 | G4 |
| S9 | 0.04 | 0.10 | | | 5.96 | |
| S10 | 0.09 | 2.81 | 1.81 | 40.29 | 6.40 | G5 |

TABLE 7-continued

F/# = 5; Dmax = 6.4; EFL = 12.66 (mm);
TTL = 23.1 (mm); FOV = 52 degrees (diagonal line); TTL/Ds = 9.023;

| surface | curvature (mm) | interval (mm) | refractive index | Abbe number | semi-diameter (mm) | object description |
|---|---|---|---|---|---|---|
| S11* | 0.06 | 2.50 | | | 6.07 | |
| S12 | 0 | 11.00 | 1.72 | 29.49 | 5.98 | second prism 30 |
| S13 | 0 | 0.50 | | | 5.49 | |
| S14 | 0 | 1.00 | 1.52 | 64.14 | 5.45 | cover glass CG |
| S15 | 0 | 0.30 | | | 5.40 | |
| S16 | — | — | — | — | — | light valve LV |

Table 8 lists aspheric coefficients and conic constant of each aspheric surface of the optical lens according to the fourth embodiment of the invention.

TABLE 8

| | K | A | B | C | D |
|---|---|---|---|---|---|
| S6 | 0 | 3.17E−04 | 2.91E−06 | −3.13E−08 | 2.23E−09 |
| S11 | 0 | −2.52E−04 | 7.05E−06 | −8.38E−08 | 4.76E−10 |

As shown in the above two tables, in this embodiment, the main difference between the fourth embodiment and the first embodiment is that the optical lens 1 of the fourth embodiment has five lenses G1-G5, and the refractive powers of the lenses G1-G5 are negative, positive, positive, negative and positive, respectively. Further, the lenses G1 and G2 are combined to form a cemented doublet, and the lenses G3 and G4 are combined to form another cemented doublet. In this embodiment, the lenses G2 and G5 are aspheric lenses, each lens in lens group 20 is formed of glass, and the overall refractive power of the optical lens 1 is positive.

A design example of an optical lens according to a fifth embodiment of the invention is described below. In this embodiment, design parameters of lenses and surrounding components of the fifth embodiment are listed in Table 9.

TABLE 9

F/# = 5; Dmax = 12.62(mm); EFL = 12.76 (mm);
TTL = 23.60 (mm); FOV = 52 degrees (diagonal line); TTL/Ds = 9.15;

| surface | curvature (mm) | interval (mm) | refractive index | Abbe number | semi-diameter (mm) | object description |
|---|---|---|---|---|---|---|
| S1 | 0 | 1.00 | — | — | 1.29 | aperture stop S |
| S2 | 0 | 5.60 | 1.52 | 64.14 | 1.61 | first prism 10 |
| S3 | 0 | 2.55 | — | — | 2.82 | |
| S4 | −0.237 | 2.37 | 1.88 | 40.77 | 3.26 | G1 |
| S5 | −0.175 | 0.10 | — | — | 4.56 | |
| S6 | −0.002 | 2.58 | 1.88 | 40.77 | 5.59 | G2 |
| S7 | −0.061 | 2.24 | — | — | 5.93 | |
| S8 | 0.037 | 3.18 | 1.88 | 40.77 | 6.31 | G3 |
| S9 | −0.048 | 0.32 | — | — | 6.22 | |
| S10 | −0.055 | 1.00 | 1.92 | 18.90 | 6.13 | G4 |
| S11 | 0.052 | 0.10 | — | — | 6.04 | |
| S12* | 0.092 | 2.57 | 1.81 | 40.29 | 6.35 | G5 |
| S13* | 0.048 | 2.00 | — | — | 6.08 | |
| S14 | 0 | 11.00 | 1.72 | 29.49 | 6.02 | second prism 30 |
| S15 | 0 | 0.50 | — | — | 5.60 | |
| S16 | 0 | 1.00 | 1.52 | 64.14 | 5.57 | cover glass CG |

TABLE 9-continued

F/# = 5; Dmax = 12.62(mm); EFL = 12.76 (mm);
TTL = 23.60 (mm); FOV = 52 degrees (diagonal line); TTL/Ds = 9.15;

| surface | curvature (mm) | interval (mm) | refractive index | Abbe number | semi-diameter (mm) | object description |
|---|---|---|---|---|---|---|
| S17 | 0 | 0.30 | — | — | 5.52 | |
| S17 | — | — | — | — | — | light valve LV |

Table 10 lists aspheric coefficients and conic constant of each aspheric surface of the optical lens according to the fifth embodiment of the invention.

TABLE 10

| | K | A | B | C | D |
|---|---|---|---|---|---|
| S12 | 0 | 1.67E−04 | −7.18E−06 | 1.23E−07 | −8.75E−10 |
| S13 | 0 | 3.05E−04 | −1.23E−05 | 2.29E−07 | −1.73E−09 |

As shown in the above two tables, in this embodiment, the main difference between the fifth embodiment and the first embodiment is that the optical lens 1 of the fifth embodiment has five lenses G1-G5 in which only the lens G5 is an aspheric lens. The refractive powers of the lenses G1-G5 are negative, positive, positive, negative and positive, respectively. In this embodiment, each lens in lens group 20 is formed of glass, and the overall refractive power of the optical lens 1 is positive.

A design example of an optical lens according to a sixth embodiment of the invention is described below. In this embodiment, design parameters of lenses and surrounding components of the sixth embodiment are listed in Table 11.

TABLE 11

F/# = 5; Dmax = 12.6(mm); EFL = 12.75 (mm);
TTL = 23.38 (mm); FOV = 52 degrees (diagonal line); TTL/Ds = 9.06;

| surface | curvature (mm) | interval (mm) | refractive index | Abbe number | semi-diameter (mm) | object description |
|---|---|---|---|---|---|---|
| S1 | 0 | 1.00 | | | 1.29 | aperture stop S |
| S2 | 0 | 5.60 | 1.52 | 64.14 | 1.61 | first prism 10 |
| S3 | 0 | 2.59 | | | 2.82 | |
| S4 | −0.241 | 1.85 | 1.88 | 40.77 | 3.26 | G1 |
| S5 | −0.213 | 0.40 | | | 4.09 | |
| S6 | −0.217 | 1.00 | 1.52 | 52.43 | 4.15 | G2 |
| S7 | −0.173 | 0.10 | | | 4.83 | |
| S8 | 0.037 | 2.82 | 1.88 | 40.77 | 6.18 | G3 |
| S9 | −0.031 | 1.54 | | | 6.30 | |
| S10 | 0.016 | 2.85 | 1.88 | 40.77 | 6.25 | G4 |
| S11 | −0.053 | 1.00 | 1.92 | 18.90 | 6.16 | G5 |
| S12 | 0.040 | 0.10 | | | 6.02 | |
| S13* | 0.114 | 2.52 | 1.53 | 76.98 | 6.19 | G6 |
| S14* | 0.065 | 2.00 | | | 6.12 | |
| S15 | 0 | 11.00 | 1.72 | 29.49 | 6.05 | second prism 30 |
| S16 | 0 | 0.50 | | | 5.61 | |
| S17 | 0 | 1.00 | 1.52 | 64.14 | 5.57 | cover glass CG |
| S18 | 0 | 0.30 | | | 5.53 | |
| S19 | — | — | — | — | — | light valve LV |

Table 12 lists aspheric coefficients and conic constant of each aspheric surface of the optical lens according to the sixth embodiment of the invention.

TABLE 12

| | K | A | B | C | D |
|---|---|---|---|---|---|
| S13 | 0 | −2.07E−05 | −5.14E−06 | −5.47E−08 | −1.20E−09 |
| S14 | 0 | 2.38E−04 | −6.39E−06 | −2.17E−07 | 2.06E−09 |

As shown in the above two tables, in this embodiment, the optical lens 1 has six lenses G1-G6 in which only the lens G6 is an aspheric lens. The refractive powers of the lenses G1-G6 are positive, negative, positive, positive, negative and positive, respectively. Further, the lenses G4 and G5 are combined to form a cemented doublet. In this embodiment, each lens in lens group 20 is formed of glass, and the overall refractive power of the optical lens 1 is positive.

A design example of an optical lens according to a seventh embodiment of the invention is described below. In this embodiment, design parameters of lenses and surrounding components of the seventh embodiment are listed in Table 13.

TABLE 13

F/# = 2.3; Dmax = 13; EFL = 11.52(mm);
TTL = 23.38 (mm); FOV = 40 degrees (diagonal line); TTL/Ds = 4.68;

| surface | curvature (mm) | interval (mm) | refractive index | Abbe number | semi-diameter (mm) | object description |
|---|---|---|---|---|---|---|
| S1 | 0 | 0.43 | | | 2.50 | aperture stop S |
| S2 | −0.08 | 0.80 | 1.50 | 81.55 | 2.54 | G1 |
| S3 | 0.02 | 0.16 | | | 2.82 | |
| S4 | 0 | 12.80 | 1.90 | 31.30 | 2.86 | first prism 10 |
| S5 | 0 | 0.99 | | | 5.50 | |
| S6* | 0.04 | 5.99 | 1.72 | 52.28 | 6.48 | G2 |
| S7* | −0.11 | 0.15 | | | 6.50 | |
| S8* | 0.03 | 3.64 | 1.70 | 55.53 | 6.45 | G3 |
| S9 | −0.08 | 0.00 | | | 6.44 | |
| S10 | −0.08 | 0.80 | 1.73 | 28.54 | 6.41 | G4 |
| S11 | 0.03 | 1.42 | | | 6.39 | |
| S12* | −0.11 | 5.37 | 1.80 | 39.59 | 6.50 | G5 |
| S13* | −0.13 | 0.15 | | | 6.14 | |
| S14 | −0.04 | 0.80 | 1.81 | 25.43 | 5.59 | G6 |
| S15 | 0.004 | 1.35 | | | 5.40 | |
| S16 | 0 | 10.00 | 1.71 | 53.94 | 5.20 | second prism 30 |
| S17 | 0 | 0.50 | | | 4.24 | |
| S18 | 0 | 1.10 | 1.51 | 61.19 | 4.15 | cover glass CG |
| S19 | 0 | 0.30 | | | 4.03 | |
| S20 | | | | | | light valve LV |

Table 14 lists aspheric coefficients and conic constant of each aspheric surface of the optical lens according to the seventh embodiment of the invention.

TABLE 14

| | K | A | B | C | D | E | F | G |
|---|---|---|---|---|---|---|---|---|
| S6 | 0 | 6.48E+00 | 3.60E−05 | 4.11E−06 | −3.42E−07 | 1.30E−08 | −1.92E−10 | 1.08E−12 |
| S7 | 0 | 6.50E+00 | 3.03E−04 | −1.74E−06 | 2.73E−07 | −7.92E−09 | 1.63E−10 | −8.74E−13 |
| S8 | 0 | 6.45E+00 | −4.22E−04 | −1.09E−05 | 2.85E−08 | 1.16E−08 | −1.58E−10 | 3.70E−13 |
| S12 | 0 | 6.50E+00 | 1.95E−03 | −1.18E−05 | −1.11E−07 | 3.84E−09 | −2.19E−11 | −2.17E−13 |
| S13 | 0 | 6.14E+00 | 9.58E−04 | 6.11E−07 | 1.22E−07 | −7.80E−09 | 2.77E−10 | −2.90E−12 |

As shown in the above two tables, the main difference between the seventh embodiment and the first embodiment is that another lens group 20 is disposed between the first prism 10 and the aperture stop S. That is, the first prism 10 separate the first lens group 20 having the lens G1 and the second lens group 20 having the lenses G2-G6. In this embodiment, the optical lens 1 has six lenses G1-G6 in which only three lenses G2, G3 and G5 are aspheric lenses. The refractive powers of the lenses G1-G6 are negative, positive, positive, negative, positive and negative, respectively. Further, in this embodiment, the F number is 2.3, and the ratio of TTL/Ds is about 4.68 that is a comparatively small value. In this embodiment, each lens in lens group 20 is formed of glass, and the overall refractive power of the optical lens 1 is positive.

A design example of an optical lens according to an eighth embodiment of the invention is described below. In this embodiment, design parameters of lenses and surrounding components of the eighth embodiment are listed in Table 15.

TABLE 15

F/# = 2.3; Dmax = 13; EFL = 11.52 (mm);
TTL = 33.23 (mm); FOV = 40 degrees (diagonal line); TTL/Ds = 6.646;

| surface | curvature (mm) | interval (mm) | refractive index | Abbe number | semi-diameter (mm) | object description |
|---|---|---|---|---|---|---|
| S1 | 0 | 0.45 | | | 2.50 | aperture stop S |
| S2 | −0.09 | 0.75 | 1.50 | 81.55 | 2.55 | G1 |
| S3 | 0.02 | 0.18 | | | 2.83 | |
| S4 | 0 | 12.40 | 1.92 | 20.88 | 2.87 | first prism 10 |
| S5 | 0 | 1.02 | | | 5.49 | |
| S6* | 0.03 | 4.84 | 1.67 | 54.78 | 6.29 | G2 |
| S7* | −0.13 | 0.15 | | | 6.47 | |
| S8 | 0.02 | 3.74 | 1.55 | 75.50 | 6.50 | G3 |
| S9 | −0.06 | 0.00 | | | 6.46 | |
| S10 | −0.06 | 1.57 | 1.74 | 27.79 | 6.43 | G4 |
| S11 | −0.01 | 1.20 | | | 6.47 | |
| S12* | −0.12 | 6.03 | 1.81 | 40.29 | 6.47 | G5 |
| S13* | −0.13 | 0.15 | | | 6.42 | |
| S14 | −0.03 | 0.75 | 1.81 | 25.43 | 5.63 | G6 |
| S15 | 0.02 | 1.63 | | | 5.40 | |
| S16 | 0 | 10.00 | 1.71 | 53.94 | 5.19 | second prism 30 |
| S17 | 0 | 0.50 | | | 4.23 | |
| S18 | 0 | 1.10 | 1.51 | 61.19 | 4.14 | cover glass CG |
| S19 | 0 | 0.30 | | | 4.02 | |
| S20 | — | — | — | — | — | light valve LV |

Table 16 lists aspheric coefficients and conic constant of each aspheric surface of the optical lens according to the eighth embodiment of the invention.

TABLE 16

| | K | A | B | C | D | E | F |
|---|---|---|---|---|---|---|---|
| S6 | 0 | −1.49E−04 | 3.79E−06 | 1.88E−07 | −1.09E−08 | 2.45E−10 | −1.78E−12 |
| S7 | 0 | 6.38E−04 | 1.28E−06 | 7.04E−08 | 3.98E−09 | −1.65E−10 | 2.48E−12 |
| S12 | 0 | 1.80E−03 | −3.41E−05 | 9.84E−07 | −2.37E−08 | 3.67E−10 | −2.29E−12 |
| S13 | 0 | 8.88E−04 | −3.27E−06 | 9.75E−08 | −6.17E−11 | −3.25E−11 | 9.11E−13 |

As shown in the above two tables, the main difference between the eighth embodiment and the seventh embodiment is that the optical lens 1 of the eighth embodiment has two aspheric lenses G2 and G5. The refractive powers of the lenses G1-G6 are negative, positive, positive, negative, positive and negative, respectively. Further, the total track length TTL is comparatively large in this embodiment, and each lens in lens group 20 is formed of glass. Besides, the overall refractive power of the optical lens 1 is positive.

A design example of an optical lens according to a ninth embodiment of the invention is described below. In this embodiment, design parameters of lenses and surrounding components of the ninth embodiment are listed in Table 17.

TABLE 17

F/# = 2.3; Dmax = 13; EFL = 11.56 (mm);
TTL = 33.34 (mm); FOV = 40 degrees (diagonal line); TTL/Ds = 6.67;

| surface | curvature (mm) | interval (mm) | refractive index | Abbe number | semi-diameter (mm) | object description |
|---|---|---|---|---|---|---|
| S1 | 0 | 0.41 | | | 2.50 | aperture stop S |
| S2 | −0.08 | 0.80 | 1.50 | 81.55 | 2.54 | G1 |
| S3 | 0.01 | 0.15 | | | 2.81 | |
| S4 | 0 | 12.80 | 1.90 | 31.32 | 2.85 | first prism 10 |
| S5 | 0 | 0.96 | | | 5.36 | |
| S6 | 0.01 | 0.80 | 1.73 | 30.54 | 5.87 | G2 |
| S7 | 0.04 | 0.00 | | | 6.11 | |
| S8 | 0.04 | 4.65 | 1.77 | 46.05 | 6.11 | G3 |
| S9* | −0.11 | 0.15 | | | 6.50 | |
| S10* | 0.04 | 3.72 | 1.69 | 53.19 | 6.50 | G4 |
| S11 | −0.07 | 0.00 | | | 6.48 | |
| S12 | −0.07 | 1.18 | 1.70 | 29.44 | 6.47 | G5 |
| S13 | 0.03 | 1.35 | | | 6.42 | |
| S14* | −0.10 | 5.42 | 1.83 | 37.16 | 6.50 | G6 |
| S15* | −0.12 | 0.15 | | | 6.11 | |
| S16 | −0.04 | 0.80 | 1.92 | 18.90 | 5.57 | G7 |
| S17 | 0.01 | 1.51 | | | 5.40 | |
| S18 | 0 | 10.00 | 1.71 | 53.94 | 5.19 | second prism 30 |
| S19 | 0 | 0.50 | | | 4.24 | |
| S20 | 0 | 1.10 | 1.51 | 61.19 | 4.16 | cover glass CG |
| S21 | 0 | 0.30 | | | 4.04 | |
| S22 | — | — | — | — | — | light valve LV |

Table 18 lists aspheric coefficients and conic constant of each aspheric surface of the optical lens according to the ninth embodiment of the invention.

TABLE 18

| | K | A | B | C | D | E |
|---|---|---|---|---|---|---|
| S9 | 0 | 2.05E−04 | 1.48E−06 | 9.19E−08 | −1.41E−09 | 9.15E−12 |
| S10 | 0 | −3.48E−04 | −5.36E−06 | 4.71E−08 | 4.48E−09 | −5.34E−11 |
| S14 | 0 | 1.71E−03 | −1.26E−05 | 3.81E−08 | 1.17E−10 | −4.10E−12 |
| S15 | 0 | 8.92E−04 | 7.00E−07 | −5.07E−10 | 1.12E−09 | −1.58E−11 |

As shown in the above two tables, in this embodiment, the main difference between the ninth embodiment and the seventh embodiment is that the optical lens 1 of the ninth embodiment has seven lenses G1-G7 in which only three lenses G3, G4 and G6 are aspheric lenses. The refractive powers of the lenses G1-G7 are negative, negative, positive, positive, negative, positive and negative, respectively. In this embodiment, each lens in lens group 20 is formed of glass, and the overall refractive power of the optical lens 1 is positive. A design example of an optical lens according to a tenth embodiment of the invention is described below. In this embodiment, design parameters of lenses and surrounding components of the tenth embodiment are listed in Table 19.

TABLE 19

F/# = 2.3; Dmax = 13; EFL = 11.51 (mm);
TTL = 33.75 (mm); FOV = 40 degrees (diagonal line); TTL/Ds = 6.75;

| surface | curvature (mm) | interval (mm) | refractive index | Abbe number | semi-diameter (mm) | object description |
|---|---|---|---|---|---|---|
| S1 | 0 | 0.46 | | | 2.50 | aperture stop S |
| S2 | −0.09 | 0.78 | 1.50 | 79.72 | 2.55 | G1 |
| S3 | 0.01 | 0.15 | | | 2.83 | |
| S4 | 0 | 12.40 | 1.92 | 20.88 | 2.87 | first prism 10 |
| S5 | 0 | 0.99 | | | 5.43 | |
| S6* | 0.03 | 5.06 | 1.67 | 54.78 | 6.21 | G2 |
| S7* | −0.13 | 0.15 | | | 6.50 | |
| S8 | 0.01 | 0.80 | 1.60 | 35.75 | 6.50 | G3 |
| S9 | 0.10 | 0.00 | | | 6.19 | |
| S10 | 0.10 | 5.31 | 1.55 | 75.50 | 6.42 | G4 |
| S11 | −0.01 | 0.15 | | | 6.42 | |
| S12 | −0.01 | 1.12 | 1.57 | 58.98 | 6.42 | G5 |
| S13 | 0.02 | 0.74 | | | 6.43 | |
| S14* | −0.10 | 4.75 | 1.76 | 44.67 | 6.46 | G6 |
| S15* | −0.14 | 0.15 | | | 5.96 | |
| S16 | −0.05 | 0.75 | 1.81 | 25.43 | 5.53 | G7 |
| S17 | −0.01 | 1.11 | | | 5.40 | |
| S18 | 0 | 10.00 | 1.71 | 53.94 | 5.16 | second prism 30 |
| S19 | 0 | 0.50 | | | 4.23 | |
| S20 | 0 | 1.10 | 1.51 | 62.91 | 4.15 | cover glass CG |
| S21 | 0 | 0.30 | | | 4.03 | |
| S22 | — | — | — | — | — | light valve LV |

Table 19 lists aspheric coefficients and conic constant of each aspheric surface of the optical lens according to the tenth embodiment of the invention.

TABLE 20

|     | K | A         | B         | C         | D          | E          | F          |
|-----|---|-----------|-----------|-----------|------------|------------|------------|
| S6  | 0 | −1.06E−04 | 3.58E−06  | 3.08E−07  | −1.38E−08  | 2.47E−10   | −1.82E−12  |
| S7  | 0 | 6.60E−04  | 1.06E−06  | 1.42E−07  | 2.06E−09   | −9.30E−11  | 9.16E−13   |
| S14 | 0 | 2.10E−03  | −3.86E−05 | 1.13E−06  | −2.58E−08  | 3.64E−10   | −2.22E−12  |
| S15 | 0 | 1.23E−03  | −1.85E−06 | 1.18E−07  | 3.36E−09   | −1.12E−10  | 2.00E−12   |

As shown in the above two tables, the main difference between the tenth embodiment and the seventh embodiment is that the optical lens 1 of the tenth embodiment has seven lenses G1-G7 in which only two lenses G2 and G6 are aspheric lenses. The refractive powers of the lenses G1-G7 are negative, positive, negative, positive, negative, positive and negative, respectively. In this embodiment, each lens in lens group 20 is formed of glass, and the overall refractive power of the optical lens 1 is positive.

A design example of an optical lens according to an eleventh embodiment of the invention is described below. In this embodiment, design parameters of lenses and surrounding components of the eleventh embodiment are listed in Table 21.

TABLE 21

F/# = 2.3; Dmax = 8.63; EFL = 11.43 (mm);
TTL = 35.27 (mm); FOV = 40 degrees (diagonal line); TTL/Ds = 7.054;

| surface | curvature (mm) | interval (mm) | refractive index | Abbe number | semi-diameter (mm) | object description |
|---------|----------------|---------------|------------------|-------------|---------------------|---------------------|
| S1      | 0              | 0.24          |                  |             | 2.50                | aperture stop S     |
| S2*     | −0.07          | 0.99          | 1.50             | 81.55       | 2.53                | G1                  |
| S3*     | −0.01          | 0.15          |                  |             | 2.82                |                     |
| S4      | 0              | 12.40         | 1.92             | 18.90       | 2.84                | first prism 10      |
| S5      | 0              | 1.17          |                  |             | 5.64                |                     |
| S6      | −0.06          | 0.75          | 1.59             | 37.21       | 5.68                | G2                  |
| S7      | 0.02           | 0.23          |                  |             | 6.73                |                     |
| S8      | 0.02           | 4.93          | 1.71             | 53.87       | 7.03                | G3                  |
| S9      | −0.07          | 0.15          |                  |             | 7.80                |                     |
| S10     | 0.04           | 4.67          | 1.71             | 53.87       | 8.63                | G4                  |
| S11     | −0.03          | 0.15          |                  |             | 8.56                |                     |
| S12     | 0.06           | 4.78          | 1.71             | 53.87       | 7.63                | G5                  |
| S13     | −0.03          | 0.32          |                  |             | 6.78                |                     |
| S14     | −0.04          | 0.75          | 1.68             | 27.33       | 6.64                | G6                  |
| S15     | 0.12           | 1.01          |                  |             | 5.40                |                     |
| S16     | 0.07           | 2.58          | 1.71             | 53.87       | 5.40                | G7                  |
| S17     | 0.04           | 0.59          |                  |             | 5.06                |                     |
| S18     | 0              | 9.00          | 1.71             | 53.94       | 5.06                | second prism 30     |
| S19     | 0              | 0.50          |                  |             | 4.22                |                     |
| S20     | 0              | 1.10          | 1.51             | 62.91       | 4.14                | cover glass CG      |
| S21     | 0              | 0.30          |                  |             | 4.02                |                     |
| S22     | —              | —             | —                | —           | —                   | light valve LV      |

Table 22 lists aspheric coefficients and conic constant of each aspheric surface of the optical lens according to the eleventh embodiment of the invention.

TABLE 22

|    | K | A        | B         | C         | D         |
|----|---|----------|-----------|-----------|-----------|
| S2 | 0 | 2.34E−03 | −7.56E−06 | −7.34E−06 | 3.92E−07  |
| S3 | 0 | 2.48E−03 | 1.63E−05  | −8.59E−06 | 4.24E−07  |

As shown in the above two tables, in the eleventh embodiment, the optical lens 1 has seven lenses G1-G7 in which only one lens G1 is an aspheric lens. The aspheric lens G1 is disposed between the first prism 10 and the aperture stop S, and all lenses in another lens group 20 are spherical lenses.

The refractive powers of the lenses G1-G7 are negative, negative, positive, positive, positive, negative and positive, respectively. In this embodiment, each lens in lens group 20 is formed of glass, and the overall refractive power of the optical lens 1 is positive. Further, a maximum semi-diameter Dmax is about 8.63, which is a comparatively large value.

A design example of an optical lens according to a twelfth embodiment of the invention is described below. In this embodiment, design parameters of lenses and surrounding components of the twelfth embodiment are listed in Table 23.

TABLE 23

F/# = 2.3; Dmax = 6.3; EFL = 11.47 (mm);
TTL = 34.62 (mm); FOV = 40 degrees (diagonal line); TTL/Ds = 6.924;

| surface | curvature (mm) | interval (mm) | refractive index | Abbe number | semi-diameter (mm) | object description |
|---------|----------------|---------------|------------------|-------------|---------------------|---------------------|
| S1      | 0.00           | 0.44          |                  |             | 2.50                | aperture stop S     |
| S2      | −0.11          | 0.75          | 1.50             | 81.55       | 2.52                | G1                  |
| S3      | 0.02           | 0.19          |                  |             | 2.80                |                     |
| S4      | 0              | 12.40         | 1.92             | 20.88       | 2.84                | first prism 10      |
| S5      | 0              | 0.41          |                  |             | 5.33                |                     |
| S6*     | 0.02           | 3.29          | 1.74             | 48.86       | 5.83                | G2                  |
| S7*     | −0.05          | 0.15          |                  |             | 5.82                |                     |
| S8      | 0.02           | 0.75          | 1.64             | 34.47       | 6.00                | G3                  |
| S9      | 0.08           | 0.00          |                  |             | 6.13                |                     |
| S10     | 0.08           | 3.97          | 1.60             | 65.44       | 6.10                | G4                  |
| S11     | −0.02          | 1.15          |                  |             | 6.26                |                     |
| S12*    | 0.12           | 4.19          | 1.50             | 81.55       | 6.40                | G5                  |
| S13     | 0.001          | 0.00          |                  |             | 5.96                |                     |
| S14     | 0.001          | 0.82          | 1.62             | 36.26       | 5.92                | G6                  |
| S15     | 0.11           | 3.25          |                  |             | 5.60                |                     |
| S16*    | −0.07          | 2.87          | 1.81             | 40.29       | 5.53                | G7                  |
| S17*    | −0.11          | 0.24          |                  |             | 5.30                |                     |
| S18     | 0              | 10.00         | 1.71             | 53.94       | 5.21                | second prism 30     |
| S19     | 0              | 0.50          |                  |             | 4.22                |                     |
| S20     | 0              | 1.10          | 1.51             | 62.91       | 4.14                | cover glass CG      |
| S21     | 0              | 0.30          |                  |             | 4.02                |                     |
| S22     | —              | —             | —                | —           | —                   | light valve LV      |

Table 24 lists aspheric coefficients and conic constant of each aspheric surface of the optical lens according to the twelfth embodiment of the invention.

TABLE 24

|    | K | A         | B        | C         | D         |
|----|---|-----------|----------|-----------|-----------|
| S6 | 0 | −2.29E−04 | 1.42E−05 | 1.98E−09  | −3.98E−10 |
| S7 | 0 | −4.84E−04 | 2.15E−05 | −2.31E−07 | 5.38E−09  |

TABLE 24-continued

|     | K | A         | B         | C        | D         |
|-----|---|-----------|-----------|----------|-----------|
| S12 | 0 | −9.37E−04 | 1.00E−05  | 1.42E−07 | −2.88E−09 |
| S16 | 0 | 2.78E−03  | −5.33E−05 | 9.03E−07 | −1.18E−08 |
| S17 | 0 | 1.92E−03  | −8.37E−06 | 3.34E−08 | −6.93E−09 |

As shown in the above two tables, the main difference between the twelfth embodiment and the seventh embodiment is that the optical lens 1 of the twelfth embodiment has seven lenses G1-G7 in which only three lenses G2, G5 and G7 are aspheric lenses. The refractive powers of the lenses G1-G7 are negative, positive, positive, positive, positive, negative and positive, respectively.

A design example of an optical lens according to a thirteenth embodiment of the invention is described below. In this embodiment, design parameters of lenses and surrounding components of the thirteenth embodiment are listed in Table 25.

TABLE 25

F/# = 2.3; Dmax = 7.01; EFL = 11.47 (mm);
TTL = 33.96 (mm); FOV = 40 degrees (diagonal line); TTL/Ds = 6.792

| surface | curvature (mm) | interval (mm) | refractive index | Abbe number | semi-diameter (mm) | object description |
|---------|----------------|---------------|------------------|-------------|--------------------|--------------------|
| S1   | 0      | 0.48  |      |       | 2.50 | aperture stop S |
| S2   | −0.10  | 0.75  | 1.50 | 81.55 | 2.54 | G1 |
| S3   | −0.01  | 0.15  |      |       | 2.82 |    |
| S4   | 0      | 12.40 | 1.88 | 21.37 | 2.89 | first prism 10 |
| S5   | 0      | 0.15  |      |       | 5.43 |    |
| S6*  | 0.005  | 4.17  | 1.74 | 48.41 | 5.61 | G2 |
| S7*  | −0.13  | 0.43  |      |       | 5.80 |    |
| S8   | −0.08  | 0.86  | 1.62 | 34.33 | 5.73 | G3 |
| S9   | 0.03   | 0.00  |      |       | 6.23 |    |
| S10  | 0.03   | 3.34  | 1.63 | 60.32 | 6.20 | G4 |
| S11  | −0.03  | 0.57  |      |       | 6.53 |    |
| S12* | 0.08   | 4.42  | 1.50 | 73.71 | 7.01 | G5 |
| S13  | 0.004  | 0.00  |      |       | 6.55 |    |
| S14  | 0.004  | 1.10  | 1.63 | 37.84 | 6.51 | G6 |
| S15  | 0.06   | 1.61  |      |       | 6.00 |    |
| S16* | −0.06  | 3.37  | 1.77 | 44.07 | 5.92 | G7 |
| S17* | −0.14  | 0.15  |      |       | 5.53 |    |
| S18  | −0.05  | 0.75  | 1.80 | 27.75 | 5.30 | G8 |
| S19  | 0.004  | 0.15  |      |       | 5.16 |    |
| S20  | 0      | 10.00 | 1.71 | 53.94 | 5.17 | second prism 30 |
| S21  | 0      | 0.50  |      |       | 4.21 |    |
| S22  | 0      | 1.10  | 1.51 | 62.91 | 4.14 | cover glass CG |
| S23  | 0      | 0.30  |      |       | 4.02 |    |
| S24  | —      | —     | —    | —     | —    | light valve LV |

Table 26 lists aspheric coefficients and conic constant of each aspheric surface of the optical lens according to the thirteen embodiment of the invention.

TABLE 26

|     | K | A         | B         | C         | D         |
|-----|---|-----------|-----------|-----------|-----------|
| S6  | 0 | −1.12E−04 | 1.15E−05  | −5.78E−08 | 4.27E−10  |
| S7  | 0 | 2.23E−04  | 1.48E−05  | −1.02E−07 | 3.27E−09  |
| S12 | 0 | −3.54E−04 | 1.51E−05  | −1.87E−07 | 1.26E−09  |
| S16 | 0 | 2.25E−03  | −4.71E−05 | 8.32E−07  | −8.42E−09 |
| S17 | 0 | 1.89E−03  | −1.08E−05 | 1.96E−07  | −2.19E−10 |

As shown in the above two tables, the optical lens 1 of the thirteenth embodiment has eight lenses G1-G8 in which three lenses G2, G5 and G7 are aspheric lenses, and the refractive powers of the lenses G1-G8 are negative, positive, negative, positive, positive, negative, positive and negative, respectively. Further, the lenses G3 and G4 are combined to form a cemented doublet, and the lenses G5 and G6 are combined to form another cemented doublet. Further, the lens G2 is attached to the first prism 10.

Further, another embodiment of the invention discloses a projection device having the optical lens 1 described in the above embodiments and other optical elements such as the light valve LV and an illumination light source. The light valve LV receives illumination light of the light source and transforms the illumination light into image beams, and the image beams pass through the optical lens 1 and are output as a virtual image. Further, no optical element (such as a lens) is provided further away from the aperture stop S towards the magnified side of the optical lens 1. Besides, the afore-mentioned projection device may be used in a head-mounted display that attaches a structure similar to glasses on a user's head, and an output image of the projection device is projected on the user's eyes.

Further, in another embodiment, an image-pickup device such as a camera is disclosed. The image-pickup device includes the optical lens 1 described in the above embodiments and a light-sensing element for gathering image light of a subject.

The above embodiments provide an optical lens that is favorable for miniaturization and has improved abbreviation correction in a limited space and good image quality.

Though the embodiments of the invention and design parameters in the tables have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the number of all lenses of each lens group or optical parameters such as refractive power for each lens may be changed, or a lens without affecting the overall optical performance may be additionally provided. It is intended that the scope of the invention be defined by the claims appended hereto and their equivalents in which all terms are meant in their broadest reasonable sense unless otherwise indicated.

What is claimed is:

1. An optical lens, comprising in order along a direction:
   an aperture stop disposed at an outermost side of all lenses of the optical lens; and
   a lens group with a positive refractive power comprising at least four lenses, at least one of the four lenses being an aspheric lens, and each of the four lenses having a clear aperture of smaller than 14 mm.

2. The optical lens as claimed in claim 1, wherein the farthest aspheric lens from the aperture stop in the lens group has a positive refractive power.

3. The optical lens as claimed in claim 1, further comprising:
   a first prism, disposed at a first side of the lens group; and
   a second prism, the second prism is a prism assembly and disposed at a second side of the lens group.

4. The optical lens as claimed in claim 3, wherein the number of all lenses with refractive power in the optical lens is at most six, the lens group comprises a cemented doublet and the overall refractive power of the optical lens is positive, the first side of the optical lens possesses afocal characteristic, and the second side of the optical lens possesses telecentric characteristic.

5. The optical lens as claimed in claim 1, wherein the four lenses comprises, arranged in order away from the aperture stop, a first lens with a positive refractive power, a second lens with a positive refractive power, a third lens with a negative refractive power and a fourth lens with a positive refractive power.

6. The optical lens as claimed in claim 1, wherein the lens group comprises six lenses, and the six lenses comprise, arranged in order away from the aperture stop, a first lens with a positive refractive power, a second lens with a positive refractive power, a third lens with a positive refractive power, a fourth lens with a positive refractive power, a fifth lens with a negative refractive power and a sixth lens with a positive refractive power.

7. The optical lens as claimed in claim 6, wherein the at least one aspheric lens is the sixth lens.

8. The optical lens as claimed in claim 1, wherein a ratio of TTL/Ds ranges from 2 to 12, where TTL is a distance along an optical axis between the aperture stop and a lens surface in the lens group farthest from the aperture stop, and Ds is a diameter of the aperture stop.

9. An optical lens, comprising:
an aperture stop; and
a lens group comprising at least four lenses, at least one of the four lenses being an aspheric lens, and each of the four lenses having a circular light-transmitting area with a diameter of smaller than 14 mm;
wherein the optical lens has a positive refractive power.

10. The optical lens as claimed in claim 9, wherein the farthest aspheric lens from the aperture stop in the lens group has a positive refractive power.

11. The optical lens as claimed in claim 9, further comprising:
a first prism, disposed at a first side of the lens group and disposed between the aperture stop and the lens group;
a second prism, the second prism is a prism assembly, the second prism is disposed at a second side of the lens group.

12. The optical lens as claimed in claim 11, wherein the number of all lenses of the optical lens is at most six, the lens group comprises a cemented doublet, the first side of the optical lens possesses afocal characteristic, and the second side of the optical lens possesses telecentric characteristic.

13. The optical lens as claimed in claim 9, wherein the four lenses comprises, arranged in order away from the aperture stop, a first lens with a positive refractive power, a second lens with a positive refractive power, a third lens with a negative refractive power and a fourth lens with a positive refractive power.

14. The optical lens as claimed in claim 9, wherein the lens group comprises six lenses, and the six lenses comprise, arranged in order away from the aperture stop, a first lens with a positive refractive power, a second lens with a positive refractive power, a third lens with a positive refractive power, a fourth lens with a positive refractive power, a fifth lens with a negative refractive power and a sixth lens with a positive refractive power.

15. The optical lens as claimed in claim 14, wherein the at least one aspheric lens is the sixth lens.

16. The optical lens as claimed in claim 9, wherein a ratio of TTL/Ds ranges from 2 to 12, where TTL is a distance along an optical axis between the aperture stop and a lens surface in the lens group farthest from the aperture stop, and Ds is a diameter of the aperture stop.

17. An optical lens, comprising in order along a direction:
an aperture stop;
an aspheric lens;
a first prism; and
a lens group comprising at least four spherical lenses.

18. The optical lens as claimed in claim 17, wherein the lens group comprises a cemented doublet, a side of the optical lens possesses afocal characteristic, and another side of the optical lens possesses telecentric characteristic.

19. The optical lens as claimed in claim 17, further comprising:
a second prism, wherein the second prism is a prism assembly, and the lens group is disposed between the first prism and the second prism.

20. The optical lens as claimed in claim 17, wherein a ratio of TTL/Ds ranges from 2 to 12, where TTL is a distance along an optical axis between an aperture stop and a lens surface in the lens group farthest from the aperture stop, and Ds is a diameter of the aperture stop.

* * * * *